United States Patent
Dangi et al.

(10) Patent No.: US 12,259,792 B1
(45) Date of Patent: *Mar. 25, 2025

(54) EFFICIENT RETENTION LOCKING OF A COPY OF A LARGE NAMESPACE ON A DEDUPLICATION FILESYSTEM

(71) Applicant: Dell Products L.P., Round Rock, TX (US)

(72) Inventors: Salil Dangi, Mission Viejo, CA (US); Nitin Madan, San Jose, CA (US); Naveen Rastogi, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/423,073

(22) Filed: Jan. 25, 2024

(51) Int. Cl.
*G06F 11/14* (2006.01)
*G06F 16/11* (2019.01)

(52) U.S. Cl.
CPC ........ *G06F 11/1453* (2013.01); *G06F 16/125* (2019.01); *G06F 2201/84* (2013.01)

(58) Field of Classification Search
CPC ............ G06F 2201/84; G06F 11/1469; G06F 11/1451; G06F 11/1464; G06F 3/065; G06F 16/128; G06F 11/1448; G06F 11/1446; G06F 11/1453; G06F 16/125; G06F 16/176
See application file for complete search history.

(56) References Cited

U.S. PATENT DOCUMENTS

| | | |
|---|---|---|
| 5,202,982 A | 4/1993 | Gramlich et al. |
| 5,893,140 A | 4/1999 | Vahalia et al. |
| 7,734,951 B1 * | 6/2010 | Balasubramanian ........................ G06F 11/1435 714/6.13 |
| 8,825,597 B1 | 9/2014 | Houston et al. |
| 8,938,425 B1 * | 1/2015 | Armangau ............ G06F 16/128 707/639 |

(Continued)

FOREIGN PATENT DOCUMENTS

CN 109032507 A 12/2018

OTHER PUBLICATIONS

Zheng et al., "BatchFS: Scaling the File System Control Plane with Client-Funded Metadata Servers," 2014 9th Parallel Data Storage Workshop, New Orleans, LA, USA, 2014, pp. 1-6, doi: 10.1109/PDSW.2014.7 (Year: 2014).

*Primary Examiner* — Robert W Beausoliel, Jr.
*Assistant Examiner* — Cheryl M Shechtman
(74) *Attorney, Agent, or Firm* — Workman Nydegger

(57) ABSTRACT

One example method includes generating first and second snapshots of a shared protection namespace of a backup storage device. The first snapshot includes a first working frozen copy of an active namespace and the second snapshot includes a second work working frozen copy of the active namespace. First and second point-in-time copies of the first and second working frozen copies are generated in the shared protection namespace. The first point-in-time copy includes first files extracted from the first working frozen copy and that are stacked in at least one first horizontal file. The second point-in-time copy includes the second files included in the second working frozen copy that are stacked in at least one second horizontal file. A retention lock is applied to the at least one first and second horizontal files.

20 Claims, 17 Drawing Sheets

(56) References Cited

U.S. PATENT DOCUMENTS

| | | | |
|---|---|---|---|
| 8,996,490 B1 * | 3/2015 | Armangau | G06Q 30/02 709/201 |
| 10,824,510 B1 | 11/2020 | Doshi et al. | |
| 11,599,506 B1 * | 3/2023 | Shilane | G06F 16/1748 |
| 2013/0066835 A1 | 3/2013 | Haubold et al. | |
| 2013/0173547 A1 | 7/2013 | Cline et al. | |
| 2014/0258239 A1 * | 9/2014 | Amlekar | G06F 11/1402 707/649 |
| 2017/0078383 A1 | 3/2017 | Murstein et al. | |
| 2018/0137139 A1 | 5/2018 | Bangalore et al. | |
| 2019/0207929 A1 * | 7/2019 | Koorapati | H04L 67/1097 |
| 2019/0213169 A1 | 7/2019 | Duggal | |
| 2021/0200641 A1 | 7/2021 | Bafna et al. | |
| 2021/0271561 A1 | 9/2021 | Mathew et al. | |
| 2022/0114062 A1 | 4/2022 | Madan et al. | |
| 2022/0197860 A1 | 6/2022 | Hickey et al. | |
| 2023/0185474 A1 | 6/2023 | Chang et al. | |
| 2024/0028466 A1 * | 1/2024 | Duggal | G06F 16/2246 |
| 2024/0256388 A1 * | 8/2024 | Dangi | G06F 11/1471 |

\* cited by examiner

EFFICIENT RETENTION LOCKING OF A COPY OF A LARGE NAMESPACE ON A DEDUPLICATION FILESYSTEM

FIELD OF THE INVENTION

Embodiments of the present invention generally relate to data backup processes. More particularly, at least some embodiments of the invention relate to systems, hardware, software, computer-readable media, and methods for retention locking a large namespace on a backup storage device.

BACKGROUND

Consider an application with a large namespace that potentially has millions of files that need to be protected using retention lock. Since these files are modifiable, the system must create a copy of these files and retention lock the files. One way to perform the retention lock would be to copy out a version of these files to another namespace, and retention lock the namespace, or all the individual files. However, this process requires reading the data, writing to another physical namespace, and enumerating the files on the destination to retention lock the same, all of which may require large amounts of computing resources. In addition, while the copying of these files is taking place, the application must be quiesced. Further, the retention locking will involve enumerating the entire namespace. Thus, there is a need for more efficient ways to retention lock a large namespace of files.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1A:
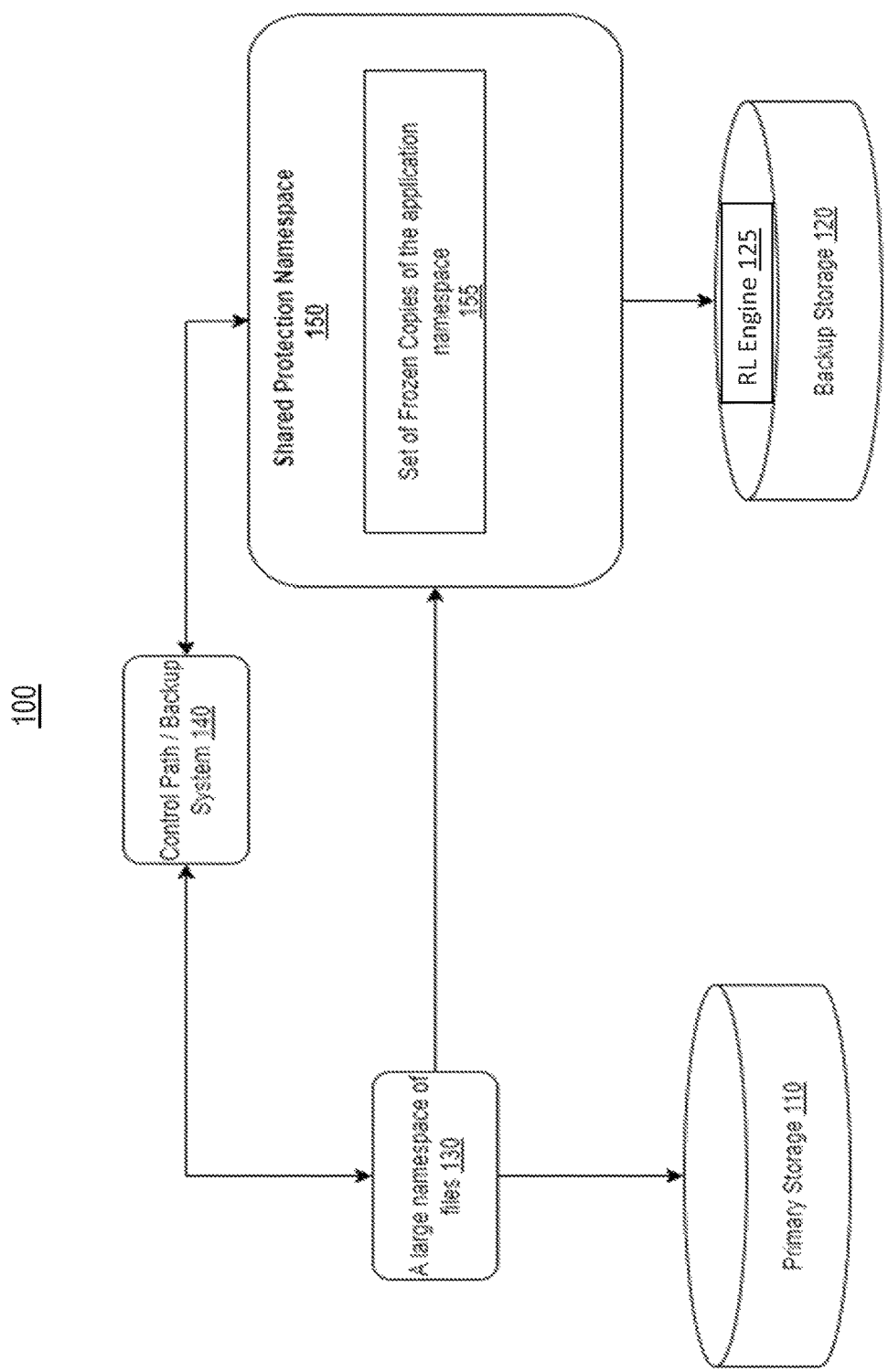
FIGS. 1A-1C disclose aspects of a backup computing system according to the embodiments disclosed herein.

Embodiments of the present invention generally relate to data backup processes. More particularly, at least some embodiments of the invention relate to systems, hardware, software, computer-readable media, and methods for retention locking a large namespace on a backup storage device.

One example method includes generating first and second snapshots of a shared protection namespace of a backup storage device. The first snapshot includes a first working frozen copy of an active namespace and the second snapshot includes a second work working frozen copy of the active namespace. First and second point-in-time copies of the first and second working frozen copies are generated in the shared protection namespace. The first point-in-time copy includes first files extracted from the first working frozen copy and that are stacked in at least one first horizontal file. The second point-in-time copy includes the second files included in the second working frozen copy that are stacked in at least one second horizontal file. A retention lock is applied to the at least one first and second horizontal files.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/ or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations.

More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC PowerProtect DataDomain storage environment. In general, however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more. VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

With particular attention now to FIG. 1A, an embodiment of a backup computing system 100 will be described. As shown in FIG. 1A, the backup computing system 100 includes a primary storage 110 and a backup storage 120 that is used to back up a live large namespace of files 130. The large namespace of files 130 (also referred herein as "large namespace 130") is a live production system, which may have millions of files required by an application executing on the system. The large namespace 130 is hosted on the primary storage 110, which is typically a high-performance primary storage system. To protect the files of the large namespace 130, frozen copies of the large namespace 130 may be hosted on the same primary storage 110 or a like primary storage system, although this is not illustrated in FIG. 1A. These frozen copies are frozen point-in-time snapshots of the live large namespace 130.

In operation, a backup control system 140 copies the frozen copies of the large namespace 130 into a shared protection namespace 150 hosted on the backup storage 120. That is, the system uses the backup storage 120 as a namespace (i.e., the shared protection namespace 150) where the frozen copies can be directly stored. In case of a disaster, or corruption, copies hosted in the shared protection namespace 150 may be restored back to the primary storage 110. The backup and restore control paths are orchestrated by the backup control system 140. In some embodiments, the frozen copies can be incremental in nature, so the backup storage 120 can include an aggregation of different frozen copies. Once the files are not required, that is the files pertaining to the frozen copies are no longer required, the frozen copies can be deleted from the shared protection namespace 150.

Figure 1B:
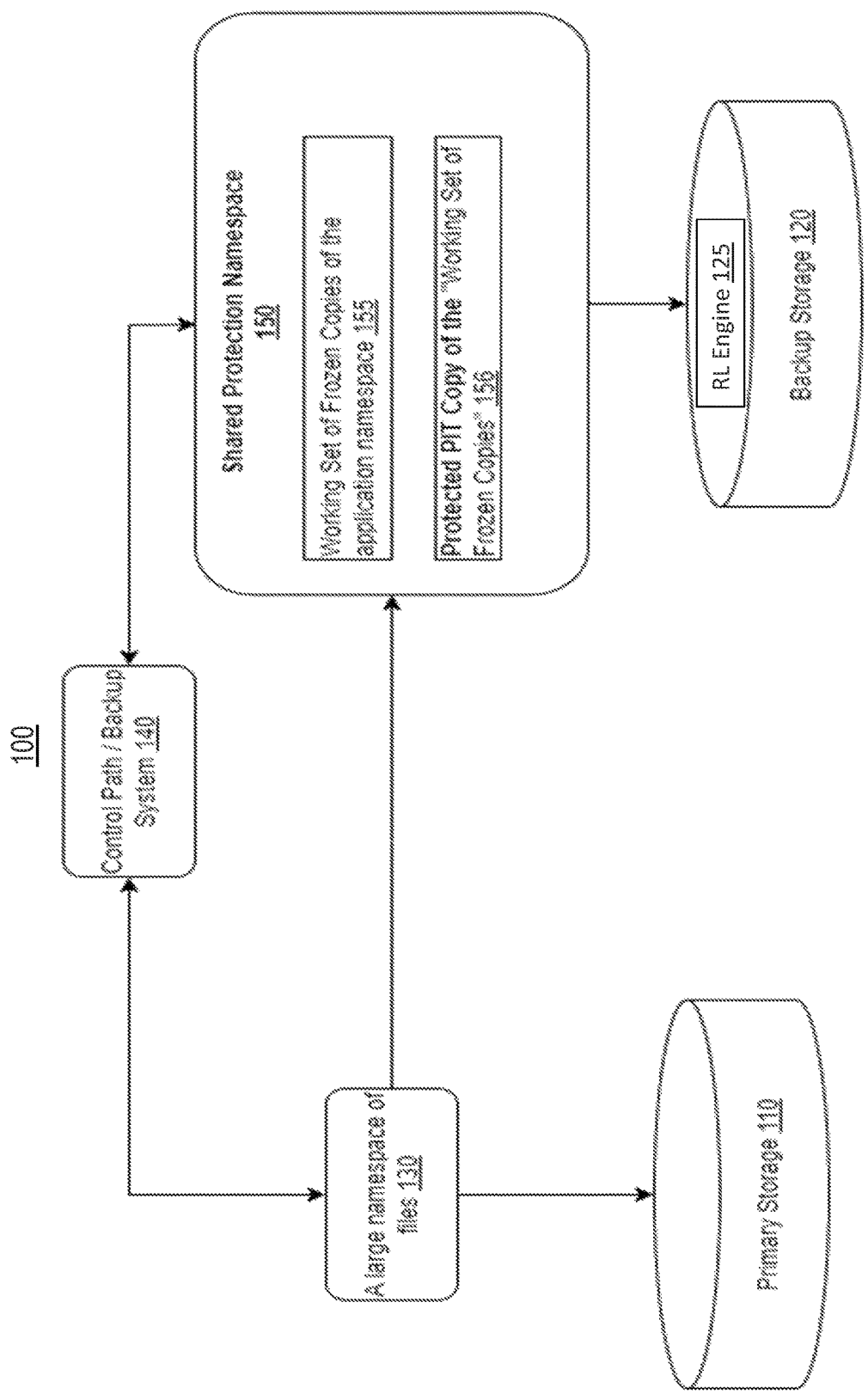

Part of the responsibility of backup storage 120 is to retain the frozen copies for a certain predetermined expiry duration. One way to retain the copies is to create point-in-time (PIT) copies of the shared protection namespace 150. For example, as shown in FIG. 1B, a PIT copy 156 of the shared protection namespace 150 is made. The PIT copy 156 is a snapshot of the shared protection namespace 150 that includes the set of working copies stored in the shared protection namespace 150 at the time the PIT copy 156 was made. The PIT copy 156 can be then deleted from the shared protection namespace 150 when the predetermined expiry duration has expired.

Copying the shared protection namespace 150 requires reads and writes of the files, including both metadata and data. In some backup storage 120s, advanced filesystems like Data Domain Filesystem (DDFS) are implemented. Such filesystems have special methods like fastcopy, which create a copy of the shared protection namespace 150 by just copying the metadata of a file to a new inode.

Thus, creating such copies of the shared protection namespace 150 may be expensive. Even with super-efficient methods like fastcopy, creating copies still takes finite time. Furthermore, for a large shared protection namespace 150, creation of copies makes it very hard for the filesystem. For example, if there are 1 million files in the working frozen set, and the protection storage is hosting 14 copies, there are 14 million files in the system.

Figure 1C:
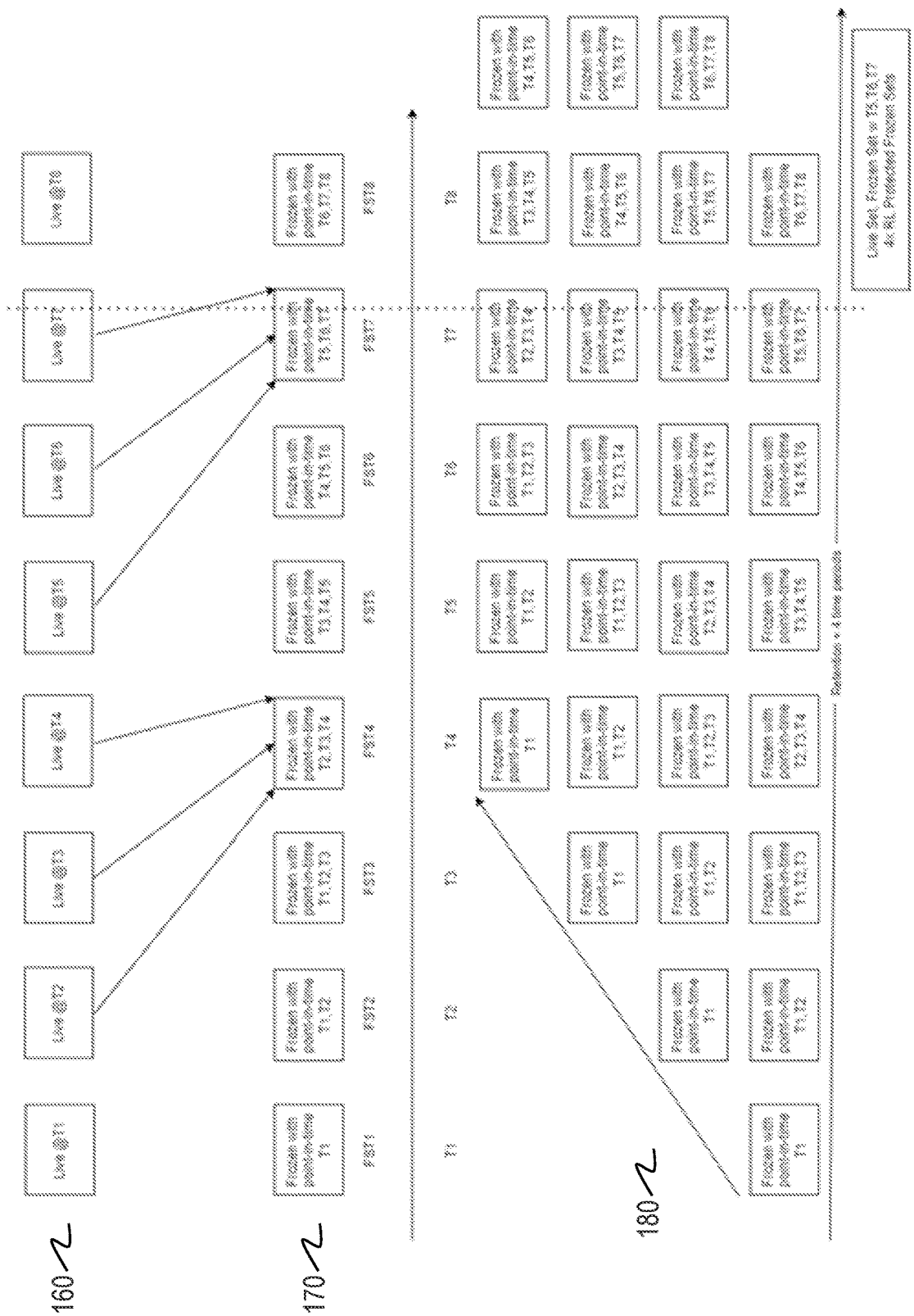

FIG. 1C illustrates an embodiment of the computing system 100 in operation. The figure depicts an applications view, where at any given point-in-time there is a live dataset 160 and a frozen point-in-time dataset 170 including snapshots taken at various points-in-time. In this embodiment, the frozen point-in-time dataset 170 keeps the last three snapshots at any given point-in-time. Thus, at time T4 the live state is captured and the live state of time T1 is dropped so that the frozen set at time T4 includes the frozen sets at times T2, T3, and T4. FIG. 1C also shows four generations 180 of frozen point-in-time snapshots of the frozen point-in-time dataset 170. Thus, at time T7, there are four frozen point-in-time snapshots, the frozen point-in-time dataset 170, and the live dataset 160.

In FIG. 1C, suppose that there is a namespace of 1 million files and the three copies of the namespace (e.g., 160, 170, and at least part of 180). If it is assumed that there is a modest 5% change rate, this would mean that the three copies add 50 k files each. This implies that there would be 1.1 million files in the working frozen set that has three point-in-time sets. If there are the four generations 180 of frozen point-in-time snapshots, there would be 4.4 million files to protect.

Thus, FIG. 1C shows that there can be copy proliferation. For a large namespace, this can create significant namespace management issues. In particular, in some instances it is desirable to apply a retention lock to each of the files in a namespace. A retention lock is a mechanism that ensures that each PIT copy of the shared protection namespace 150 is not able to be changed in any way during the duration of the retention lock. In some embodiments, the backup storage 120 includes a retention lock engine 125 that is able to apply a retention lock to each individual file in the PIT copy. However, when the PIT copy includes millions of individual files, applying the retention lock to each individual file can use up a large amount of computing system resources and may also take an undesirable amount of time.

Accordingly, the embodiments disclosed herein advantageously provide novel systems and methods that allow for an initial backup to be taken and for a retention lock to be applied to the initial backup in an efficient manner that reduces the amount of computing resources needed. In addition, the novel systems and methods further allow for frequent incremental backups to be taken and for a retention lock to be applied to the frequent incremental backups in the initial manner. Embodiments of the novel systems and methods will now be explained.

Figure 2A:
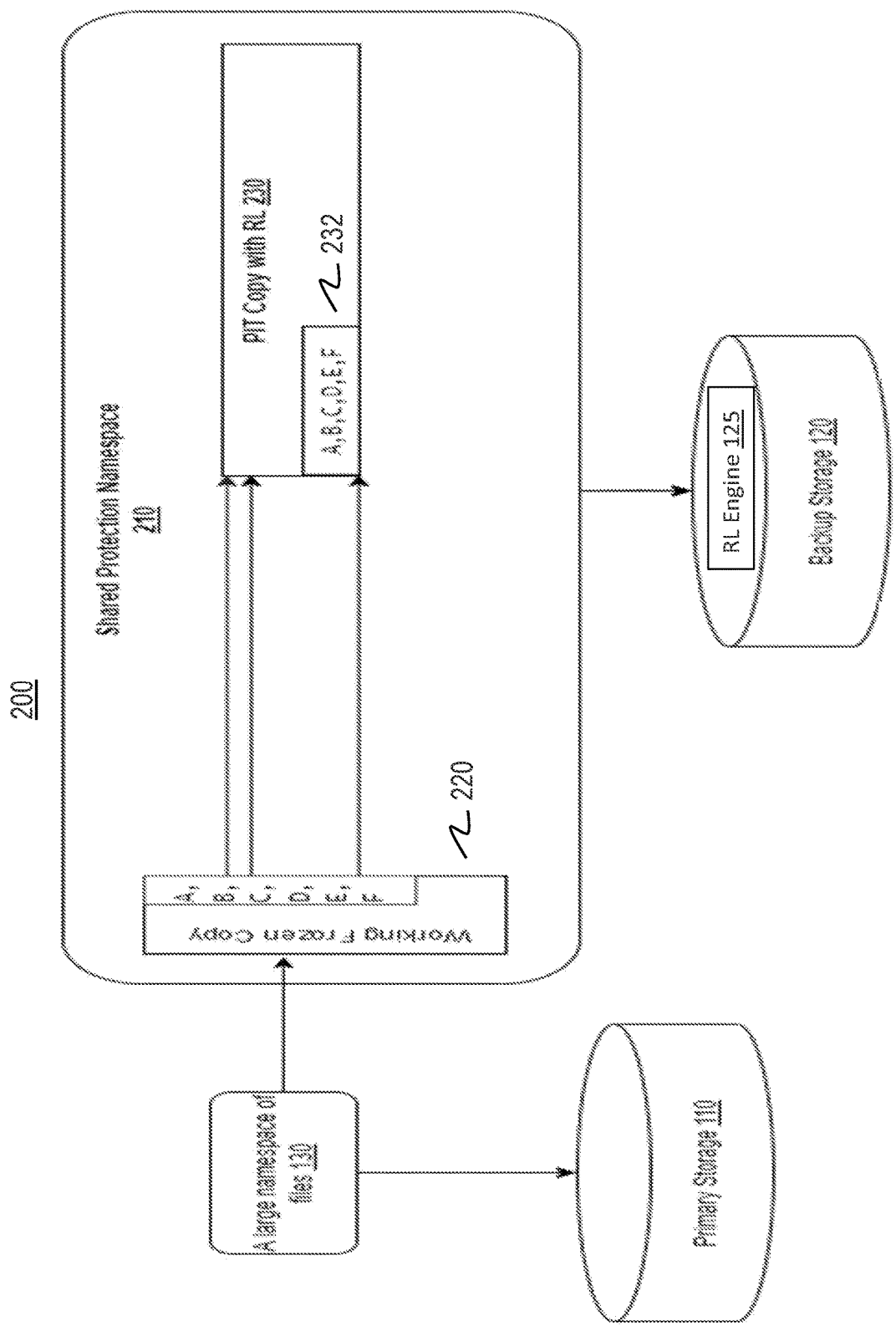
FIGS. 2A-2C disclose aspects of a backup computing system according to the embodiments disclosed herein.
Figure 2B:
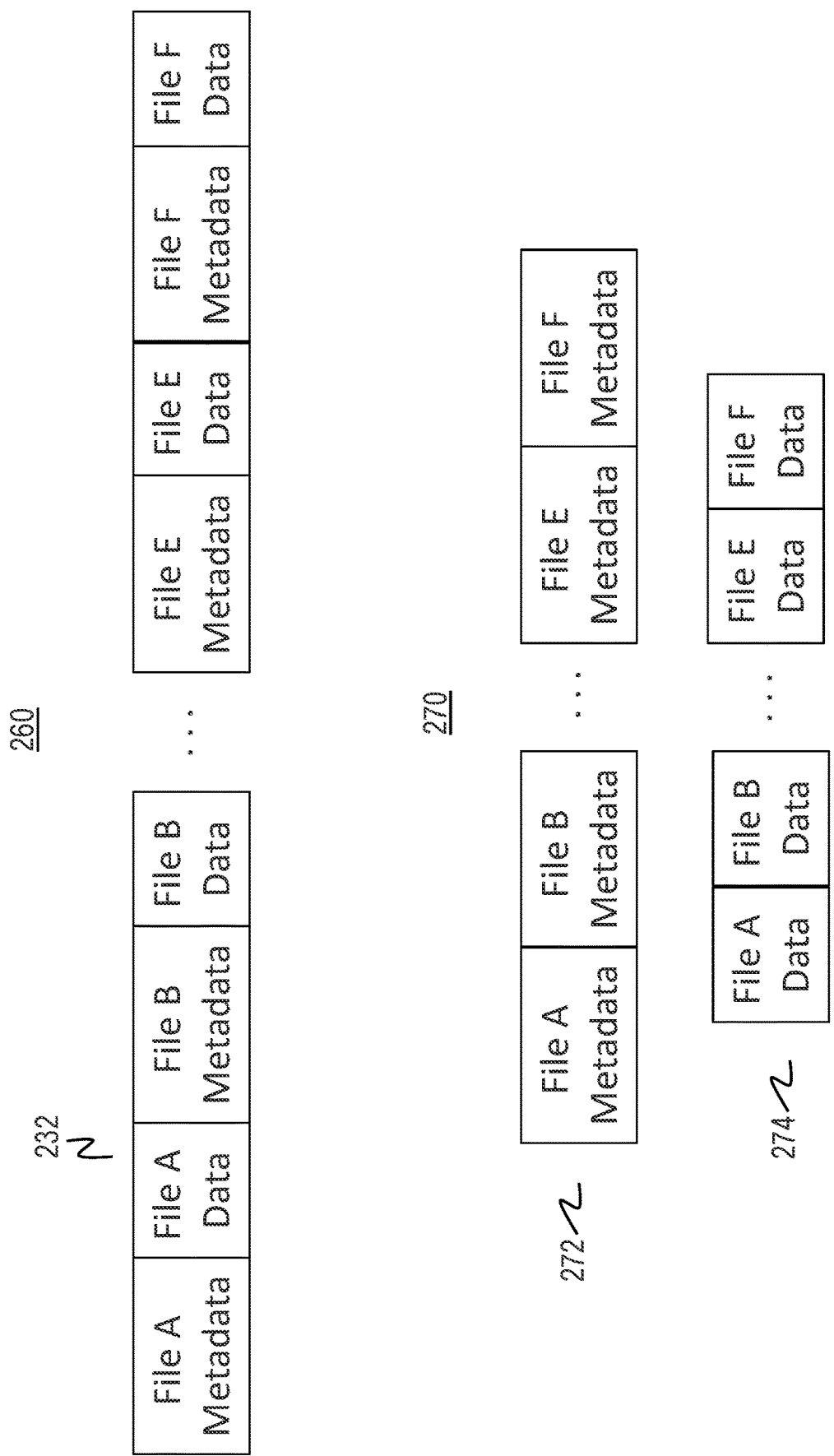
Figure 2C:
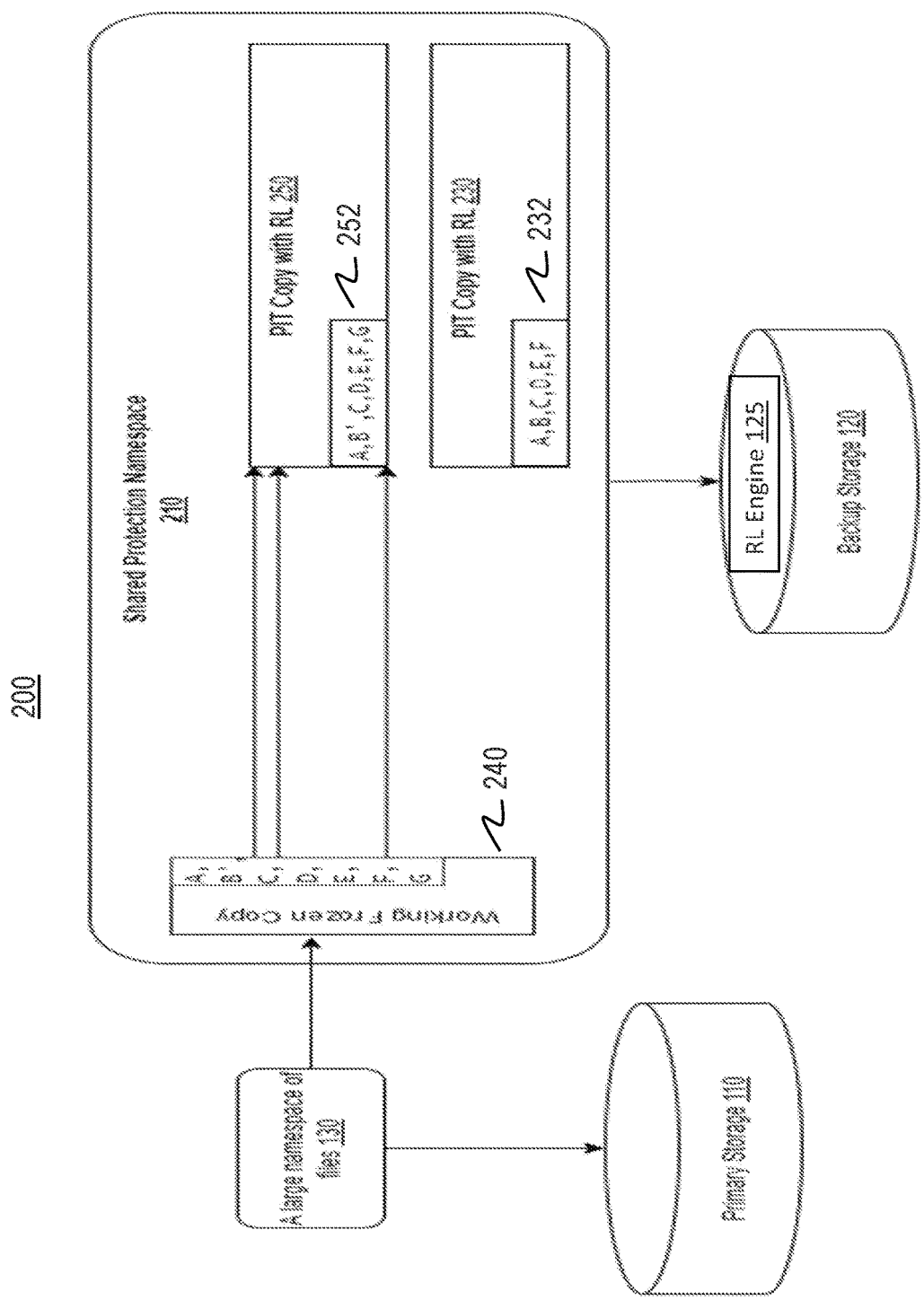

FIGS. 2A-2C illustrate a backup computing system 200, which may be an embodiment of the backup computing system 100. Thus, the backup computing system 200 includes all of the elements previously described in relation to the backup computing system 100 and all of those elements need not be shown or described in relation to FIGS. 2A-2C.

FIG. 2A illustrates a backup operation. During the backup operation, the backup control system 140 copies a working frozen copy 220 of the large namespace 130 into a shared protection namespace 210 of the backup storage 120, which may correspond to the shared protection namespace 150. As illustrated, working frozen copy 220 includes six individual files: a file A, a file B, a file C, a file D, a file E, and a file F. It will be appreciated that only including six files in working frozen copy 220 is for ease of explanation only and that working frozen copy 220 may include any number of additional files, usually numbering in the millions of files.

The backup control system 140 also instructs the shared protection namespace 210 to make a PIT copy 230 of the working frozen copy 220. As mentioned previously, it is burdensome to the backup computing system 200 to apply a retention lock to each individual file of working frozen copy 220, especially when the total number of files are in the millions. Accordingly, the backup control system 140 instructs the shared protection namespace 210, while generating the PIT copy 230, to stack each of the individual files in the working frozen copy 220 into at least one horizontal file having a flat structure. As shown in FIG. 2A, the individual files A-F are brought forward from the working frozen copy 220 and are stacked into a horizontal file 232. In one embodiment, the backup storage 120 may be able to implement a Virtual Synthetic process that generates the horizontal file 232 as VS file, which will be a synthetic full copy of the individual files A-F in the working frozen copy 220. An advantage of using the Virtual Synthetic process is that the horizontal file 232 does not involve reading of the data. Rather, this may be considered a scatter gather method of creating a new object with pointers from the other objects, so it is more efficient than traditional tar/zip methods.

It will be noted, however, that the horizontal file 232 need not be a single file, but can include multiple files. In general, the concept of stacking the individual files of the working frozen copy 220 into a horizontal file means going from a large number of files to a much smaller number of files. Thus, in FIG. 2A, six individual files are stacked into a single horizontal file 232. However, if the working frozen copy 220 included millions of files, then perhaps these millions of files would be stacked into a few hundred or less horizontal files. Thus, in the embodiments and claims disclosed herein, the individual files of a working frozen copy are stacked into at least one horizontal file, but could be stacked into more than one horizontal file as long as the total number is only a small number of the overall individual files.

FIG. 2B illustrates an embodiment 260 of the horizontal file 232. As illustrated, in the embodiment 260, the horizontal file 232 is generated by alternating the metadata and data for each of the individual files A-F. This results in a single horizontal file. The metadata may describe the file permissions, size and the directory structure, and its permissions. By reading the metadata, the corresponding directory structure can be re-hydrated.

FIG. 2B also shows an embodiment 270 of when the individual files A-F of the working frozen copy 220 are stacked into more than one horizontal file, where the number of more horizontal files is still less than the number of individual files. As illustrated, the metadata for each of the individual files A-F is stacked in a horizontal file 272 and the data for each of the individual files A-F is stacked in a horizontal file 274. Thus, embodiments 260 and 270 illustrate that there can be any number of alternate ways to generate a horizontal file. It will be noted that the discussion of generating the horizontal file 232 using the Virtual Synthetic process and the discussion of the embodiments 260 and 270 will also apply to any horizontal file discussed in relation to the further embodiments that are discussed in more detail to follow.

Once the horizontal file 232 has been generated, the retention lock engine 125 of the backup storage 120 is able to apply a retention lock to the horizontal file 232. As illustrated, the PIT copy 230 includes the horizontal file 232 which has been retention locked. Since the horizontal file 232 is a single file (or a small number of files as previously described), the amount of computing resources and time needed to apply the retention lock to the horizontal file 232 is greatly reduced when compared to applying the retention lock to each individual file.

FIG. 2C illustrates a subsequent backup operation that is made after changes have been made to the large namespace 130 during subsequent operation of the application utilizing the primary storage 110. During the subsequent backup operation, the backup control system 140 copies a working frozen copy 240 of the large namespace 130 into the shared protection namespace 210. As illustrated, working frozen copy 240 includes seven individual files: the file A, a file B', the file C, the file D, the file E, the file F, and a file G. Thus, the changes made to the large namespace 130 during the subsequent operation include file B being updated to file B' and the addition of the file G, while no changes have been made to files A, C, D, E, and F.

The backup control system 140 instructs the shared protection namespace 210 to make a PIT copy 250 of the working frozen copy 240 and, while generating the PIT copy 250, to stack each of the individual files in the working frozen copy 240 into at least one horizontal file having a flat structure. As shown in FIG. 2C, the individual files A, B', C, D, E, F, and G are brought forward from the working frozen copy 240 and are stacked into a horizontal file 252 that is generated in the manner previously described.

Once the horizontal file 252 has been generated, the retention lock engine 125 of the backup storage 120 is able to apply a retention lock to the horizontal file 252. As illustrated, the PIT copy 250 includes the horizontal file 252 which has been retention locked. Since the horizontal file 252 is a single file (or a small number of files as previously described), the amount of computing resources and time needed to apply the retention lock to the horizontal file 252 is greatly reduced when compared to applying the retention lock to each individual file.

For all backup operations following the backup operation described in FIG. 2C, the process will be repeated. That is, a working frozen copy will be copied to the shared protection namespace 210. At least one horizontal file will then be generated for the individual files of the working frozen copy while generating a PIT copy of the working frozen copy. A retention lock will be applied to the at least one horizontal file.

Figure 3A:
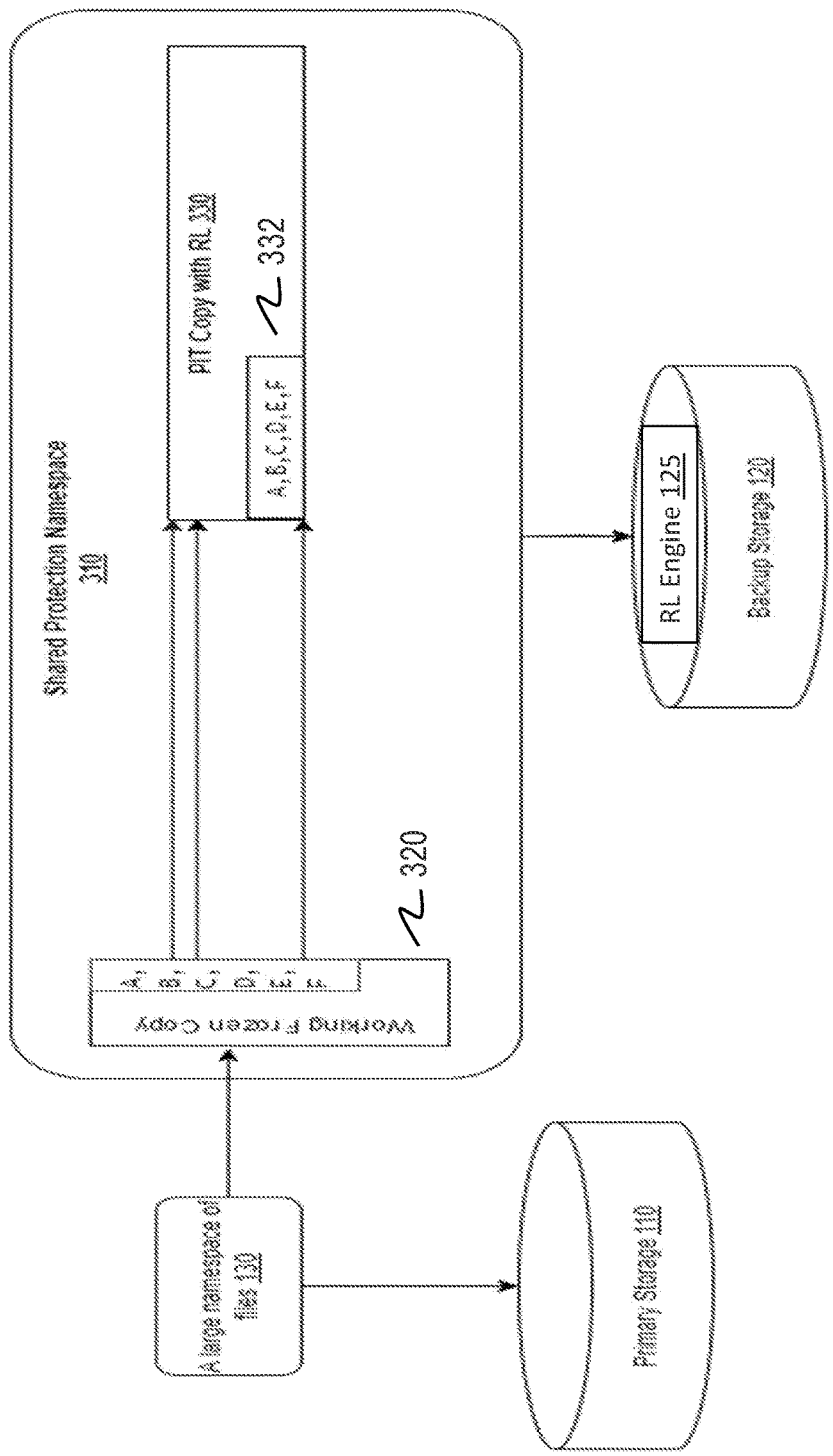
FIGS. 3A-3C disclose aspects of a backup computing system according to the embodiments disclosed herein.
Figure 3B:
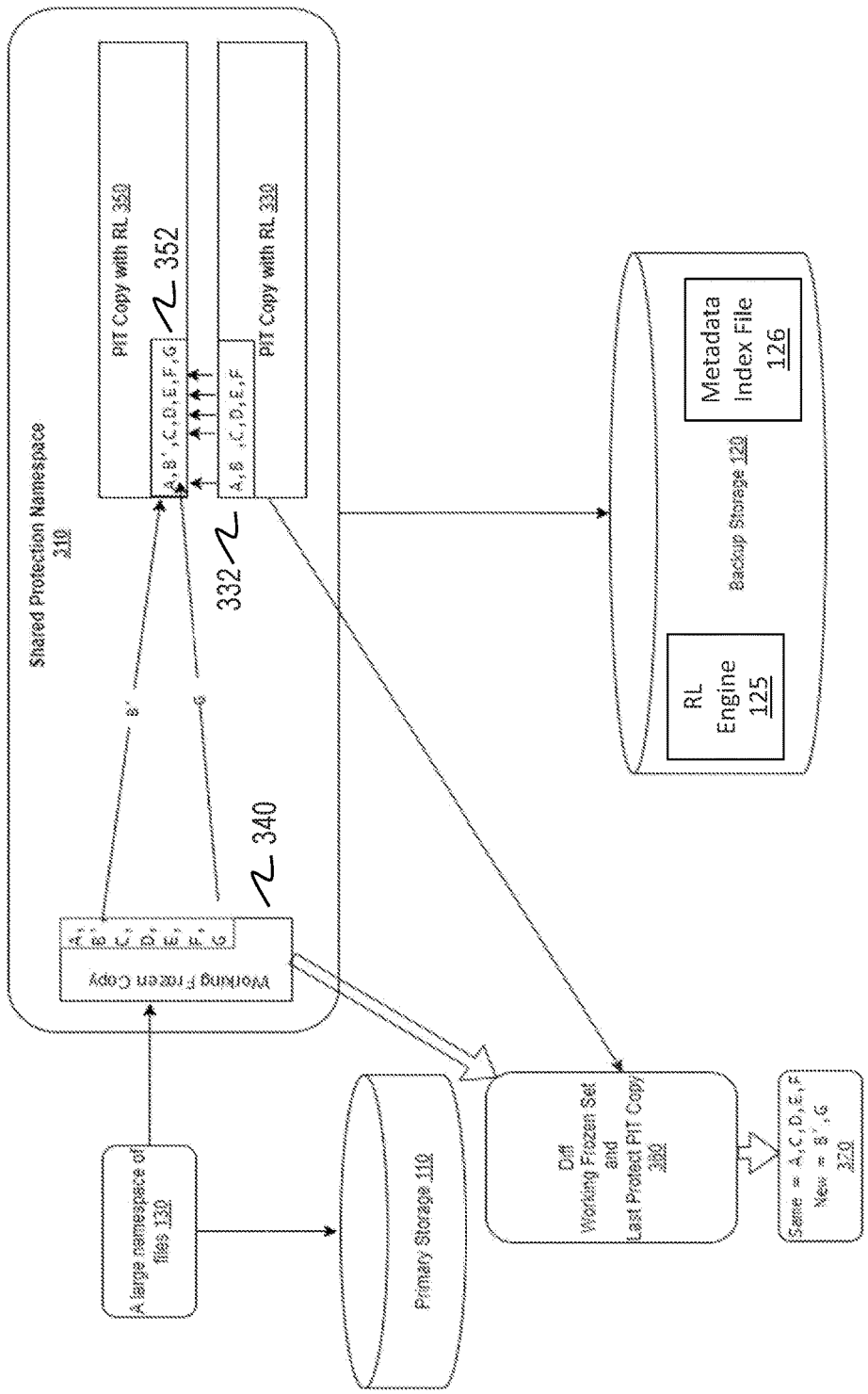
Figure 3C:
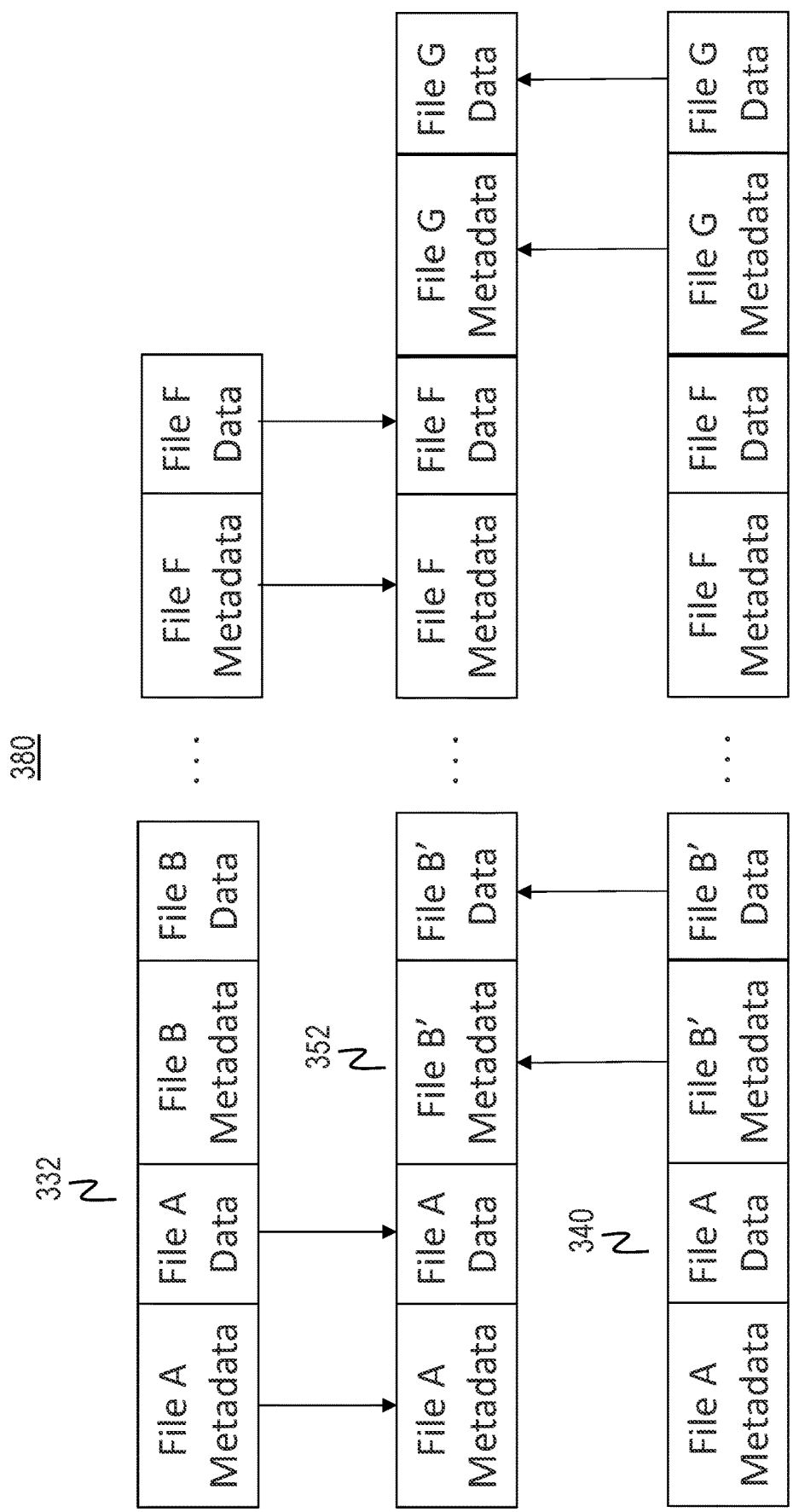

FIGS. 3A-3C illustrate a backup computing system 300, which may be an embodiment of the backup computing system 100 and 200. Thus, the backup computing system 300 includes all of the elements previously described in relation to the backup computing systems 100 and 200 and all of those elements need not be shown or described in relation to FIGS. 3A-3C.

FIG. 3A illustrates a backup operation. During the backup operation, the backup control system 140 copies a working frozen copy 320 of the large namespace 130 into a shared protection namespace 310 of the backup storage 120, which may correspond to the shared protection namespace 150. As illustrated, working frozen copy 320 includes six individual files: a file A, a file B, a file C, a file D, a file E, and a file F. It will be appreciated that only including six files in working frozen copy 320 is for ease of explanation only and that working frozen copy 320 may include any number of additional files, usually numbering in the millions of files.

The backup control system 140 instructs the shared protection namespace 310 to make a PIT copy 330 of the working frozen copy 320 and, while generating the PIT copy 330, to stack each of the individual files in the working frozen copy 320 into at least one horizontal file having a flat structure. As shown in FIG. 3A, the individual files A-F are brought forward from the working frozen copy 320 and stacked into a horizontal file 332 that is generated in the manner previously described.

Once the horizontal file 332 has been generated, the retention lock engine 125 of the backup storage 120 is able to apply a retention lock to the horizontal file 332. As illustrated, the PIT copy 330 includes the horizontal file 332 which has been retention locked. Since the horizontal file 332 is a single file (or a small number of files as previously described), the amount of computing resources and time needed to apply the retention lock to the horizontal file 332 is greatly reduced when compared to applying the retention lock to each individual file.

FIG. 3B illustrates a subsequent backup operation that is made after changes have been made to the large namespace 130 during subsequent operation of the application utilizing the primary storage 110. During the subsequent backup operation, the backup control system 140 copies a working frozen copy 340 of the large namespace 130 into the shared protection namespace 310. As illustrated, working frozen copy 340 includes seven individual files: the file A, a file B', the file C, the file D, the file E, the file F, and a file G. Thus, the changes made to the large namespace 130 during the subsequent operation include file B being updated to file B' and the addition of the file G, while no changes have been made to files A, C, D, E, and F.

The backup control system 140 instructs the shared protection namespace 310 to make a PIT copy 350 of the working frozen copy 340 and, while generating the PIT copy 350, to stack each of the individual files in the working frozen copy 340 into at least one horizontal file having a flat structure. In the embodiment of FIG. 3B, to generate the at least one horizontal file, the shared protection namespace 310 performs a metadata difference operation (also referred to as a "Diff" operation) 360 that will now be explained.

The purpose of the metadata difference operation 360 is to determine a subset of files that are included in both the PIT copy 330 and the working frozen copy 340 and to determine a subset of files that are only included in the working frozen copy 340. However, since the horizontal file 332 of the PIT copy 330 is a single file (or a small number of files), which is the purpose of generating the horizontal file, and the working frozen copy 340 includes a number of individual files (seven in the current invention), a direct comparison of the horizontal file 332 and the working frozen copy 340 cannot be made.

As previously described, the individual files A-F of the working frozen copy 320 include both metadata files and data files. During the process of generating the horizontal file 332, a metadata index file 126 is also created in the backup storage 120 in which is stored the metadata of the individual files A-F. The metadata index file 126 is then used in the metadata difference operation 360. A comparison of the metadata in the index file 126 and the working frozen copy 340 can be made as the number of files in each is much closer.

During the metadata difference operation 360, the shared namespace 310 walks through and compares the metadata of the individual files A-F stored in the metadata index file 126 with the metadata of the individual files A, B', C-F, and G of the working frozen copy 340. Thus, when the metadata in the metadata index file 126 is compared with the metadata of the files in the working frozen copy 340, it is found, as shown at 370, that the files A, C, D, E, and F are included in both the PIT copy 330 and the working frozen copy 340, while the files B' and G are new and thus are only included in the working frozen copy 340. In other words, the presence of identical metadata in both the metadata index file 126 and the metadata of files in the working frozen copy 340 for the files A, C, D, E, and F shows that these files are included in both the PIT copy 330 and the working frozen copy 340. As metadata index file 126 lacks the metadata for the files B' and G in the working frozen copy 340, it is deduced that these are new/updated files and not present in the PIT copy 330.

The shared protection namespace 310 then stacks the individual files A, B', C, D, E, F, and G into a horizontal file 352. As shown in FIG. 3B, the files A, C, D, E, and F that are included in both the PIT copy 330 and the working frozen copy 340 are brought from the horizontal file 332 to the horizontal file 352. In some embodiments, the metadata index file 126 is used to determine the files of the horizontal file 332 that are to be brought forward to the horizontal file 352 in embodiments where backup system is not able to directly determine the contents of horizontal file 332. Only the files B' and G, which are only included in the working frozen copy 340, are brought from the working frozen copy 340 to horizontal file 352. Since only files that have changed are brought forward from the working frozen copy 340, the number of files that need to be brought forward from the working frozen copy 340 is greatly reduced.

In addition, bringing the files A, C, D, E, and F that are included in both the PIT copy 330 and the working frozen copy 340 from the horizontal file 332 to the horizontal file 352 saves on the number of operations needed to bring the files forward. For example, when it is determined that file A will be brought forward from the horizontal file 332 to the horizontal file 352, an operation to bring file A forward is not automatically performed. Rather, a hold on bringing file A forward is put in place. Next, when it is determined that file B' will be brought forward from the working frozen copy 340 to the horizontal file 352, it is determined that file B' is coming from a different location than file A and so an operation is performed that brings file A forward from the horizontal file 332 to the horizontal file 352. However, an operation to bring file B' forward is not performed, but a hold on bringing file B' forward is put in place.

Next, when it is determined that file C will be brought forward from the horizontal file 332 to the horizontal file 352, it is determined that file B' is coming from a different location than file C and so an operation is performed that brings file B' forward from the working frozen copy 340 to the horizontal file 352. However, an operation to bring file C forward is not performed, but a hold on bringing file C forward is put in place.

Next, when it is determined that file D will be brought forward from the horizontal file 332 to the horizontal file 352, it is determined that file D is contiguous to file C and thus is coming from the same location as file C. Thus, an operation to bring file D forward is not performed, but a hold on bringing file D forward is put in place.

It is then determined that files E and F will also be brought forward from the horizontal file 332 to the horizontal file 352. It will also be determined that files E and F are contiguous to files C and D. Thus, operations to bring files E and F forward are not performed, but holds on bringing files E and F forward are also put in place.

Finally, when it is determined that file G will be brought forward from the working frozen copy 340 to the horizontal file 352, it is determined that files C-F are coming from a different location than file G and so an operation is performed that brings files C-F forward from the horizontal file 332 to the horizontal file 352. However, an operation to bring file G forward is not performed, but a hold on bringing file G forward is put in place. Since file G is the last file, an operation will then be performed that brings file G forward from the working frozen copy 340 to the horizontal file 352.

The above process shows that the embodiments disclosed herein reduce the number of operations needed to bring files forward to the horizontal file 352. For example, in the embodiment there are seven files that are brought forward to the horizontal file 352. However, only four operations, instead of seven operations, were needed to bring all seven files forward. This is due to the fact that files C-F are contiguous. That is, since only two files changed, files B' and G, there are several unchanged files that are contiguous. As discussed, only one operation is needed for the unchanged files that are contiguous. Accordingly, in the embodiments disclosed herein, the number of operations needed to bring forward files to the horizontal file 352 from the horizontal file 332 and the frozen working copy 340 is at most 2*N, where N is the number of changed files.

Although the above process is shown using only a small number of files for ease of explanation, in actual operation millions of files will be used. For embodiments where frequent backups are made, there will be large numbers of contiguous files that do not change. This will greatly reduce the number of operations needed to bring files forward from the horizontal file 332 to the horizontal file 352. For example, suppose that there are 1 million files and only 1000 of the files had changed since the last backup. In such case, there would only need to be 2000 operations at most (i.e., 2*N, where N is 1000 changed files) needed to bring files forward from the horizontal file 332 to the horizontal file 352.

FIG. 3C illustrates an embodiment 380 of generating the horizontal file 352 in the manner described. As shown in FIG. 3C, the horizontal file 332 is a file where the metadata and data for the files A-F alternate. In addition, for ease of illustration only, the files in the working frozen copy 340 are also shown as having the metadata and data alternate. As further shown in the figure, the file A and F metadata and data is brought forward from the horizontal file 332 to the horizontal file 352. Although not shown, the ellipses represent that the files C-E metadata and data is also brought forward from the horizontal file 332 to the horizontal file 352. In some embodiments, this may be done by having a pointer to metadata and data in horizontal file 332 be brought forward from the horizontal file 332 to the horizontal file 352. It will be noted that the metadata and data of File B is not brought forward from the horizontal file 332 to the horizontal file 352 since File B was not included in either the horizontal file 332 or the working frozen copy 340. The metadata and data of the file B' and the file G are brought forward from the working frozen copy 340 to the horizontal file 352 since these two files are only included in the working frozen copy 340.

Once the horizontal file 352 has been generated, the retention lock engine 125 of the backup storage 120 is able to apply a retention lock to the horizontal file 352. As illustrated, the PIT copy 350 includes the horizontal file 352 which has been retention locked. Since the horizontal file 352 is a single file (or a small number of files as previously described), the amount of computing resources and time needed to apply the retention lock to the horizontal file 352 is greatly reduced when compared to applying the retention lock to each individual file.

For all backup operations following the backup operation described in FIG. 3B, the process will be repeated. That is, a working frozen copy will be copied to the shared protection namespace 310. At least one horizontal file will then be generated for the individual files of the working frozen copy where the files that are included in horizontal file of the most recent PIT copy and the working frozen copy are brought forward from the horizontal file of the most recent PIT copy and the files only included in the working frozen copy are brought forward from the working frozen copy. A retention lock will be applied to the at least one horizontal file.

The embodiment of FIGS. 3A-3C provides one non-limiting advantage when the PIT copy 330 and the PIT copy 350 are later replicated to another backup storage server. Because most of the files in the horizontal file 352 of PIT copy 350 are the same as those in the horizontal file 332 of PIT copy 330, this can be leveraged to increase the speed of the replication since only the data from the horizontal file 332 of PIT copy 330 need be copied as pointer can be included in the horizontal file 352 of PIT copy 350 for the files that are the same as those in the horizontal file 332 of PIT copy 330.

Figure 4A:
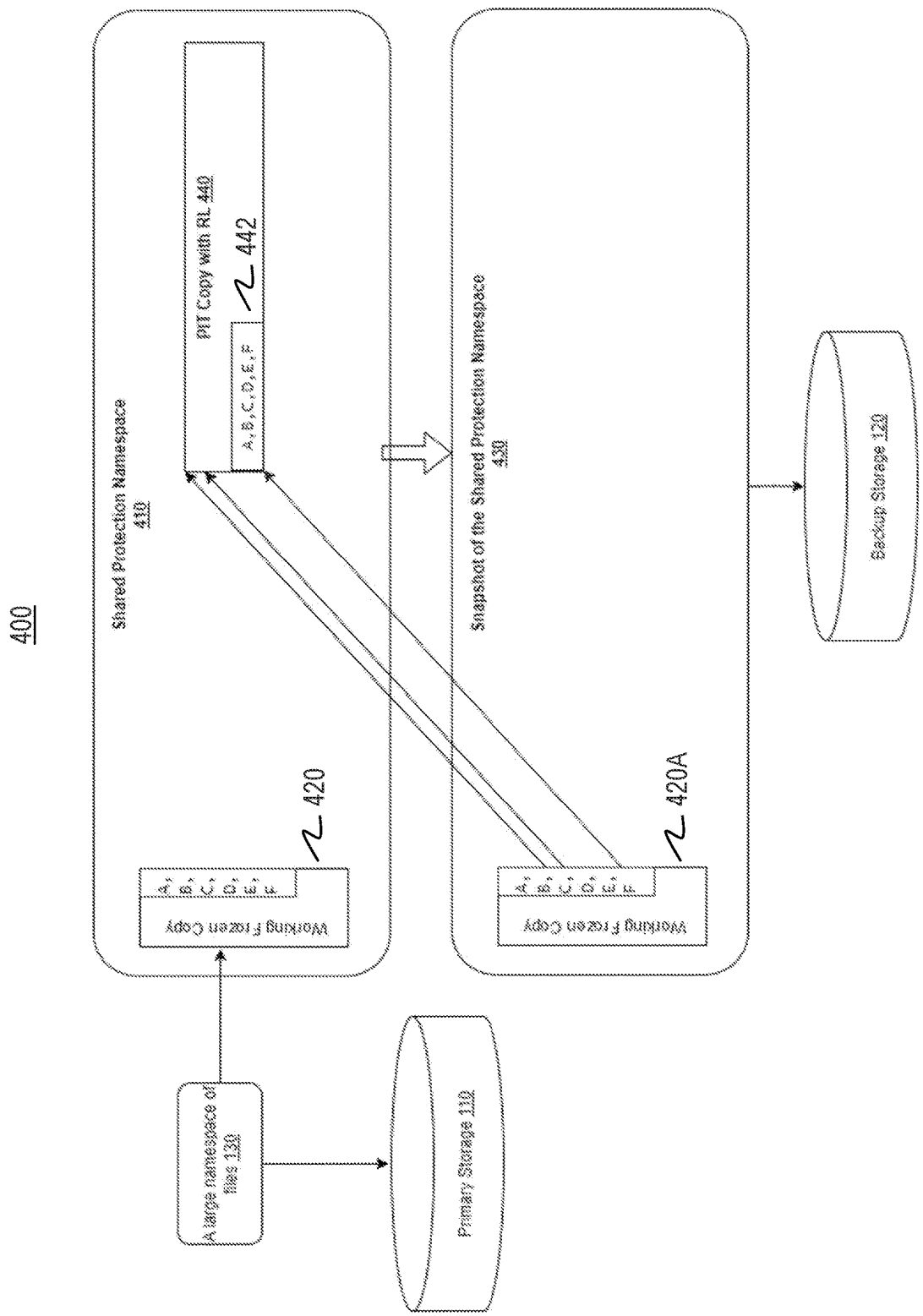
FIGS. 4A and 4B disclose aspects of a backup computing system according to the embodiments disclosed herein.
Figure 4B:
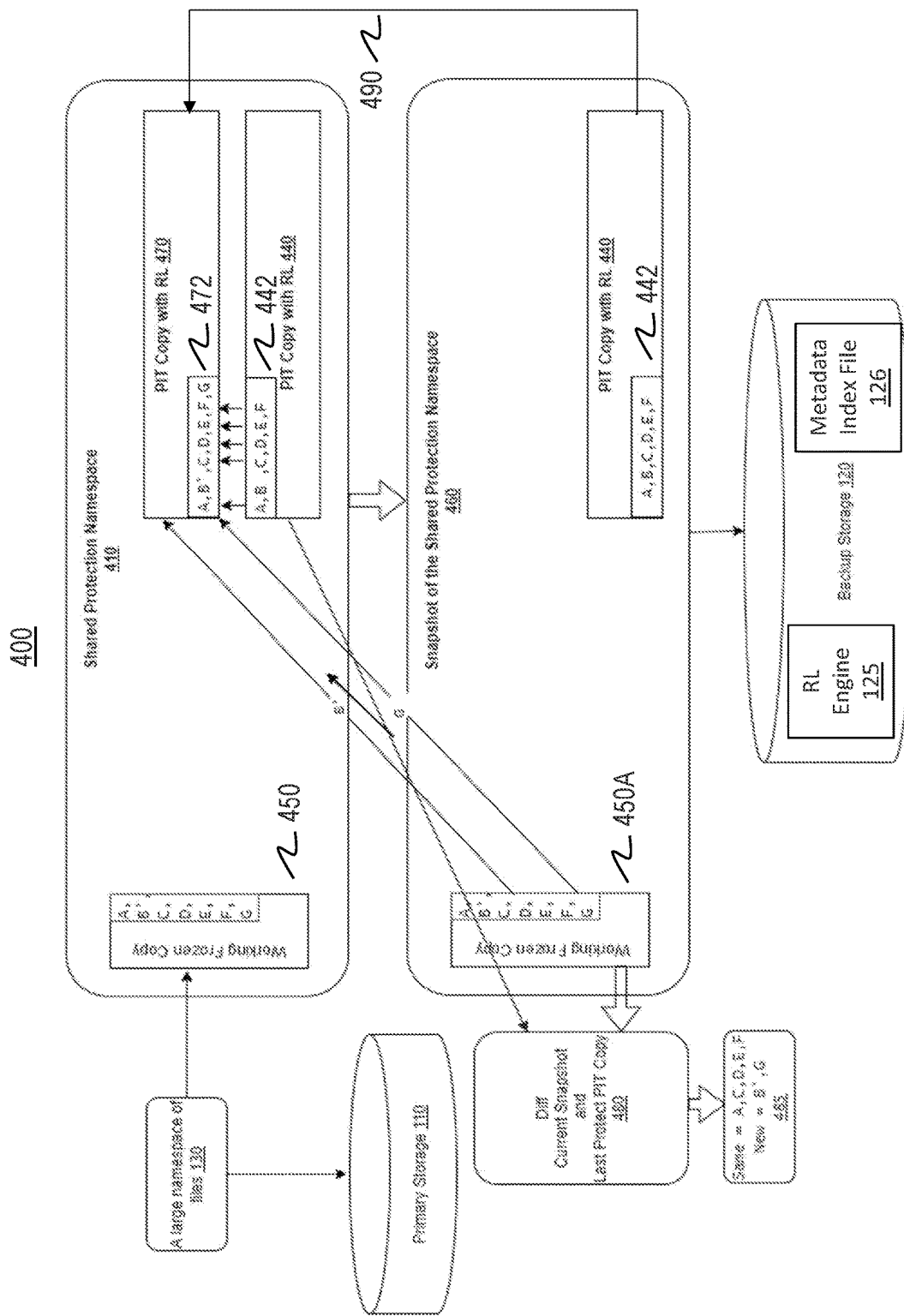

FIGS. 4A and 4B illustrate a backup computing system 400, which may be an embodiment of the backup computing systems 100, 200, and 300. Thus, the backup computing system 400 includes all of the elements previously described in relation to the backup computing systems 100, 200, and 300 and all of those elements need not be shown or described in relation to FIGS. 4A and 4B.

FIG. 4A illustrates a backup operation. During the backup operation, the backup control system 140 copies a working frozen copy 420 of the large namespace 130 into a shared protection namespace 410 of the backup storage 120, which may correspond to the shared protection namespace 150. As illustrated, working frozen copy 420 includes six individual files: a file A, a file B, a file C, a file D, a file E, and a file F. It will be appreciated that only including six files in working frozen copy 420 is for ease of explanation only and that working frozen copy 420 may include any number of additional files, usually numbering in the millions of files.

It will be appreciated that while the backup operation is going on, changes made to the large namespace 130 are unable to be written to the working frozen copy 420. In other words, the system is unable to update the working frozen copy 420 until the PIT copy 440 is generated. This can lead to application write quiesce. The embodiment of FIGS. 4A and 4B advantageously solves this problem by generating a snapshot 430 and 460 as will be explained. Since the snapshots 430 and 460 can be used in the backup operation as described, the working frozen copy 420 is able to be updated almost immediately as it is no longer needed for the backup operation, thus unquiescing the working frozen copy part of the shared protection namespace.

Thus, in the embodiment the backup control system 140 instructs the shared protection namespace 410 to take the snapshot 430 of the shared protection namespace 410 at the time the working frozen copy 420 is copied to the shared protection namespace 410. Note that the working frozen copy included in the snapshot 430 is labeled as working frozen copy 420A. This is to indicate that the working frozen copy 420 in the namespace 410 is now free to be changed as previously described and the working frozen copy 420A is the version of the working frozen copy 420 that existed at the time the snapshot 430 was generated.

The backup control system 140 then instructs the shared protection namespace 410 to make a PIT copy 440 of the working frozen copy 420 and, while generating the PIT copy 440, to stack each of the individual files in the working frozen copy 420 into at least one horizontal file having a flat structure. As shown in FIG. 4A, rather than extracting the files A-F from the working frozen copy 420 in the shared protection namespace 410 as was done in the embodiment of FIG. 3A, the individual files A-F are brought forward from the working frozen copy 420A that is included in the snapshot 430. The individual files A-F are stacked into a horizontal file 442 that is generated in the manner previously described.

Once the horizontal file 442 has been generated, the retention lock engine 125 of the backup storage 120 is able to apply a retention lock to the horizontal file 442. As illustrated, the PIT copy 440 includes the horizontal file 442 which has been retention locked. Since the horizontal file 442 is a single file (or a small number of files as previously described), the amount of computing resources and time needed to apply the retention lock to the horizontal file 442 is greatly reduced when compared to applying the retention lock to each individual file. The snapshot 430 can then be released once the PIT copy 470 has been generated.

FIG. 4B illustrates a subsequent backup operation that is made after changes have been made to the large namespace 130 during subsequent operation of the application utilizing the primary storage 110. During the subsequent backup operation, the backup control system 140 copies a working frozen copy 450 of the large namespace 130 into the shared protection namespace 510. As illustrated, working frozen copy 450 includes seven individual files: the file A, a file B', the file C, the file D, the file E, the file F, and a file G. Thus, the changes made to the large namespace 130 during the subsequent operation include file B being updated to file B' and the addition of the file G, while no changes have been made to files A, C, D, E, and F.

The backup control system 140 then instructs the shared protection namespace 410 to take a snapshot 460 of the shared protection namespace 410 at the time the working frozen copy 450 is copied to the shared protection namespace 410. Thus, the snapshot 460 includes the working frozen copy 450A and the PIT copy 440 as shown in FIG. 4B. Note that the working frozen copy included in the snapshot 460 is labeled as working frozen copy 450A. This is to indicate that the working frozen copy 450 in the namespace 410 is now free to be changed as previously described and the working frozen copy 450A is the version of the working frozen copy 450 that existed at the time the snapshot 460 was generated.

The backup control system 140 instructs the shared protection namespace 410 to make a PIT copy 470 of the working frozen copy 450A and, while generating the PIT copy 470, to stack each of the individual files in the working frozen copy 450 into at least one horizontal file having a flat structure. In the embodiment of FIG. 4B, to generate the at least one horizontal file, the shared protection namespace 410 performs a metadata difference operation (also referred to as a "Diff" operation) 480 as will now be explained.

The purpose of the metadata difference operation 480 is to determine a subset of files that are included in both the PIT copy 440 and the working frozen copy 450A that is included in the snapshot 460 and to determine a subset of files that are only included in the working frozen copy 450A that is included in the snapshot 460. However, since the horizontal file 442 of the PIT copy 440 is a single file (or a small number of files), which is the purpose of generating the horizontal file, and the working frozen copy 450A includes a number of individual files (seven in the current invention), a direct comparison of the horizontal file 442 and the working frozen copy 450A cannot be made.

As previously described, the individual files A-F of the working frozen copy 420A include both metadata files and data files. During the process of generating the horizontal file 442, a metadata index file 126 is also created in the backup storage 120 in which is stored the metadata of the individual files A-F. The metadata index file 126 is then used in the metadata difference operation 480. A comparison of the metadata in the index file 126 and the working frozen copy 450A can be made as the number of files in each is much closer.

During the metadata difference operation 480, the shared namespace 410 walks through and compares the metadata of the individual files A-F stored in the metadata index file 126 with the metadata of the individual files A, B', C-F, and G of the working frozen copy 450A. Thus, when the metadata in the metadata index file 126 is compared with the metadata of the files in the working frozen copy 450A, it is found, as shown at 485, the files A, C, D, E, and F are included in both the PIT copy 440 and the working frozen copy 450A that is included in the snapshot 460, while the files B' and G are new and thus are only included in the working frozen copy 450A that is included in the snapshot 460. In other words, the presence of identical metadata in both the metadata index file 126 and the metadata of files in the working frozen copy 450A for the files A, C, D, E, and F shows that these files are included in both the PIT copy 440 and the working frozen copy 450A. As metadata index file 126 lacks the metadata for the files B' and G in the working frozen copy 340, it is deduced that these are new/updated files and not present in the PIT copy 440.

The shared protection namespace 410 then stacks the individual files A, B', C, D, E, F, and G into a horizontal file 472. As shown in FIG. 4B, the files A, C, D, E, and F that are included in both the PIT copy 440 and the working frozen copy 450A that is included in the snapshot 460 are brought from the horizontal file 442 to the horizontal file 472. In some embodiments, the metadata index file 126 is used to determine the files of the horizontal file 442 that are to be brought forward to the horizontal file 472 in embodiments where backup system is not able to directly determine the contents of horizontal file 442. Only the files B' and G, which are only included in the working frozen copy 450A that is included in the snapshot 460, are brought from the working frozen copy 450A to horizontal file 472. Since only files that have changed are brought forward from the working frozen copy 450A that is included in the snapshot 460, the number of files that need to be brought forward from the working frozen copy 450A is greatly reduced.

In addition, bringing the files A, C, D, E, and F that are included in both the PIT copy 440 and the working frozen copy 450A from the horizontal file 442 to the horizontal file 472 saves on the number of operations needed to bring the files forward. For example, when it is determined that file A will be brought forward from the horizontal file 442 to the horizontal file 472, an operation to bring file A forward is not automatically performed. Rather, a hold on bringing file A forward is put in place. Next, when it is determined that file B' will be brought forward from the working frozen copy 450A to the horizontal file 472, it is determined that file B' is coming from a different location than file A and so an operation is performed that brings file A forward from the horizontal file 442 to the horizontal file 472. However, an operation to bring file B' forward is not performed, but a hold on bringing file B' forward is put in place.

Next, when it is determined that file C will be brought forward from the horizontal file 442 to the horizontal file 472, it is determined that file B' is coming from a different location than file C and so an operation is performed that brings file B' forward from the working frozen copy 450A to the horizontal file 472. However, an operation to bring file C forward is not performed, but a hold on bringing file C forward is put in place.

Next, when it is determined that file D will be brought forward from the horizontal file 442 to the horizontal file 472, it is determined that file D is contiguous to file C and thus is coming from the same location as file C. Thus, an operation to bring file D forward is not performed, but a hold on bringing file D forward is put in place.

It is then determined that files E and F will also be brought forward from the horizontal file 442 to the horizontal file 472. It will also be determined that files E and F are contiguous to files C and D. Thus, operations to bring files E and F forward are not performed, but holds on bringing files E and F forward are also put in place.

Finally, when it is determined that file G will be brought forward from the working frozen copy 450A to the horizontal file 472, it is determined that files C-F are coming from a different location than file G and so an operation is performed that brings files C-F forward from the horizontal file 442 to the horizontal file 472. However, an operation to bring file G forward is not performed, but a hold on bringing file G forward is put in place. Since file G is the last file, an operation will then be performed that brings file G forward from the working frozen copy 450A to the horizontal file 472.

The above process shows that the embodiments disclosed herein reduce the number of operations needed to bring files forward to the horizontal file 472. For example, in the embodiment there are seven files that are brought forward to the horizontal file 472. However, only four operations, instead of seven operations, were needed to bring all seven files forward. This is due to the fact that files C-F are contiguous. That is, since only two files changed, files B' and G, there are several unchanged files that are contiguous to each other. As discussed, only one operation is needed for the unchanged files that are contiguous to each other. Accordingly, in the embodiments disclosed herein, the number of operations needed to bring forward files to the horizontal file 472 from the horizontal file 442 and the frozen working copy 450A is at most 2*N, where N is the number of changed files.

It is noted that FIG. 4B shows that the files A, C, D, E, and F that are included in both the PIT copy 440 and the working frozen copy 450A that is included in the snapshot 460 are brought from the horizontal file 442 of the PIT copy 440 included in the shared protection namespace 410. However, this need not be the case. As described above, the snapshot 450 includes a copy of the PIT copy 440 including the horizontal file 442. Thus, as shown at 490 the files A, C, D, E, and F that are included in both the PIT copy 440 and the working frozen copy 450A that is included in the snapshot 460 may alternatively be brought from the horizontal file 442 in the snapshot 460 to the horizontal file 472.

Once the horizontal file 472 has been generated, the retention lock engine 125 of the backup storage 120 is able to apply a retention lock to the horizontal file 472. As illustrated, the PIT copy 470 includes the horizontal file 472 which has been retention locked. Since the horizontal file 472 is a single file (or a small number of files as previously described), the amount of computing resources and time needed to apply the retention lock to the horizontal file 472 is greatly reduced when compared to applying the retention lock to each individual file. The snapshot 460 can then be released once the PIT copy 470 has been generated since the snapshot 460 is no longer needed. This in turn helps to reduce the backup storage 120 resources that are needed.

For all backup operations following the backup operation described in FIG. 4B, the process will be repeated. That is, a working frozen copy will be copied to the shared protection namespace 410 and a snapshot will be taken of the working frozen copy. At least one horizontal file will then be generated for the individual files of the working frozen copy included in the snapshot, where the files that are included in horizontal file of the most recent PIT copy and the working frozen copy included in the snapshot are brought forward from the horizontal file of the most recent PIT copy and the files only included in the working frozen copy included in the snapshot are brought forward from the working frozen copy included in the snapshot. A retention lock will be applied to the at least one horizontal file. It will be appreciated that the embodiment of FIGS. 4A and 4B combines the non-limiting advantages of the embodiments discussed previously in relation to FIGS. 3A-3C.

Figure 5A:
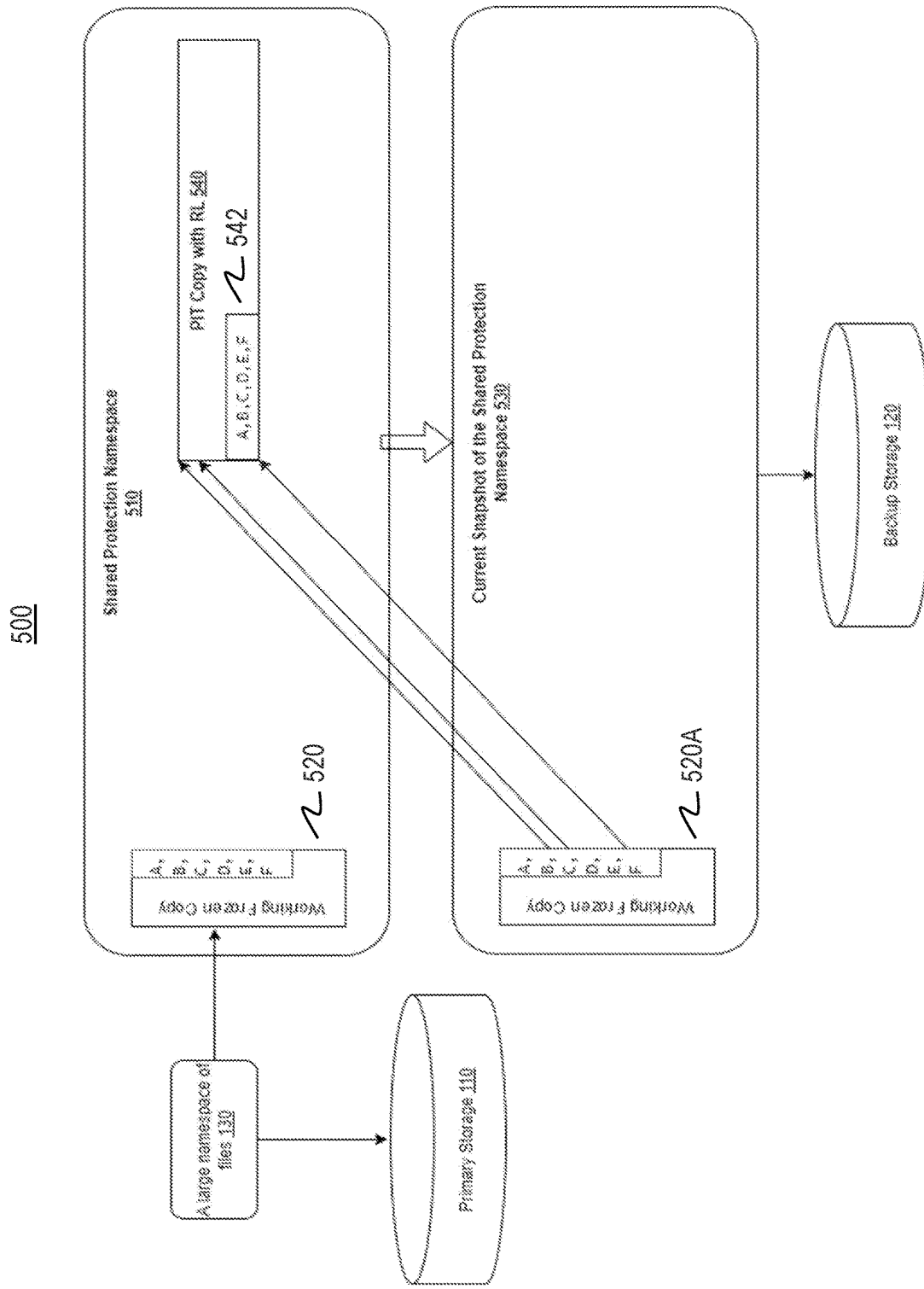
FIGS. 5A-5C disclose aspects of a backup computing system according to the embodiments disclosed herein.
Figure 5B:
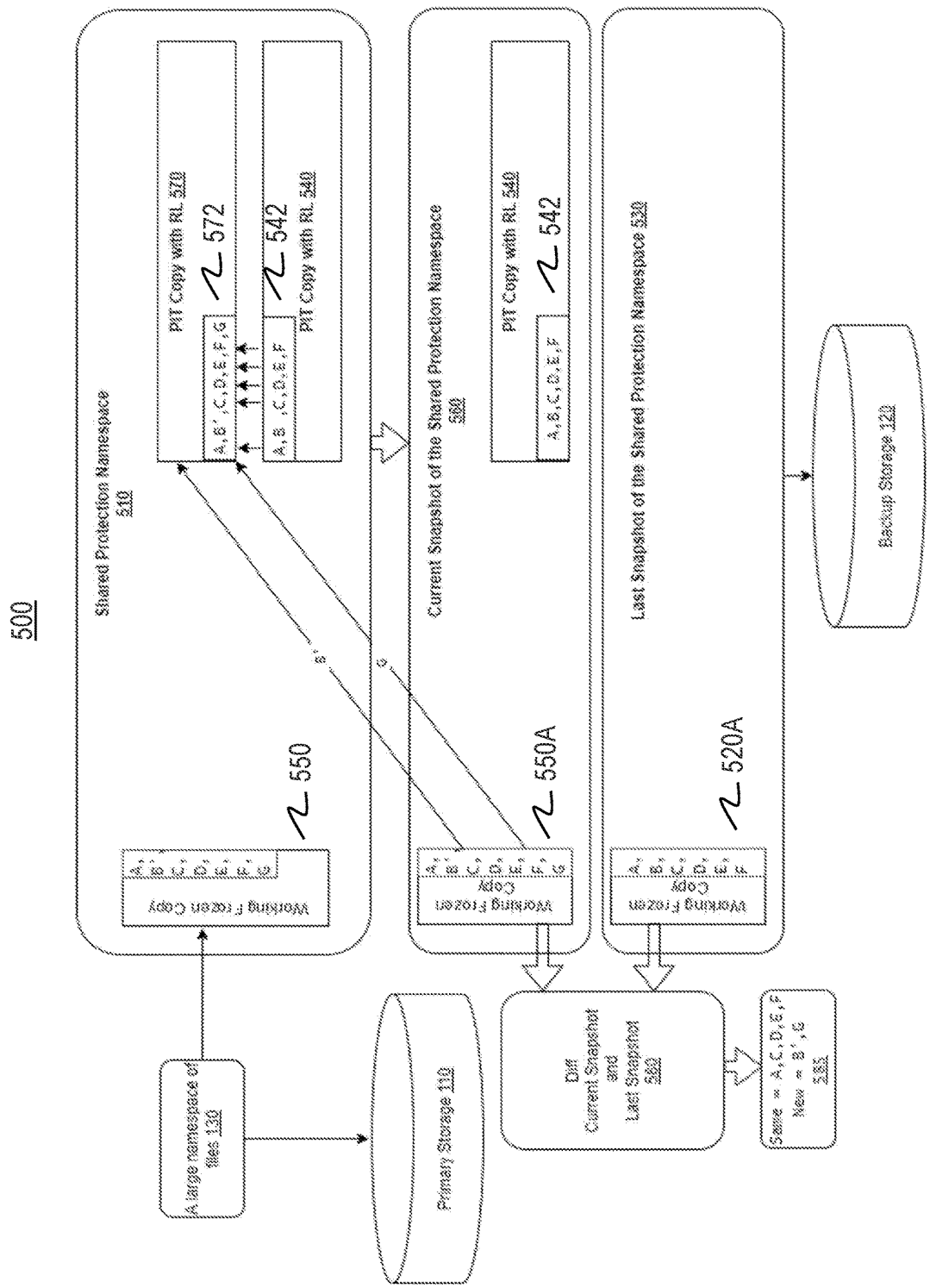
Figure 5C:
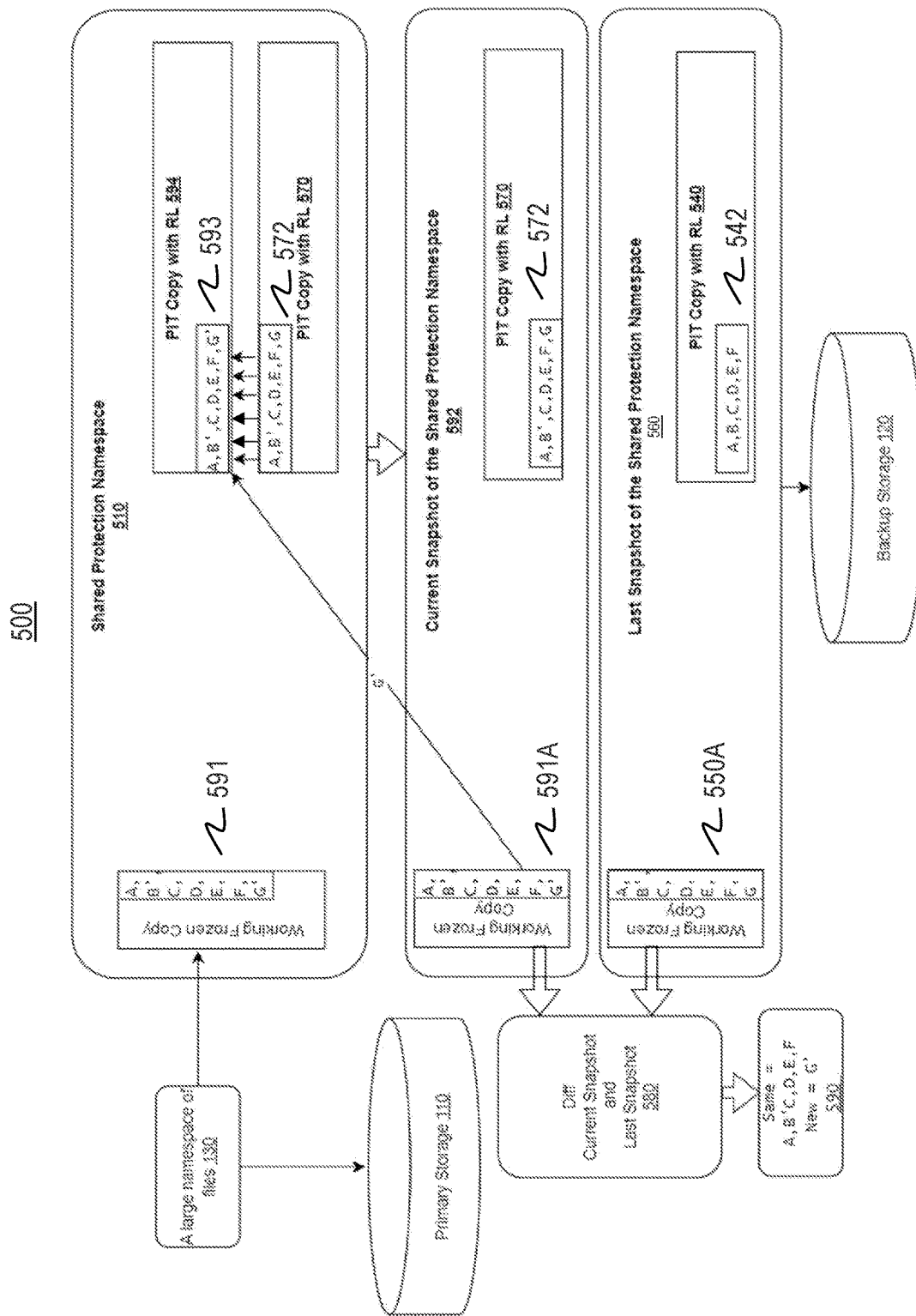

FIGS. 5A-5C illustrate a backup computing system 500, which may be an embodiment of the backup computing systems 100, 200, 300, or 400. Thus, the backup computing system 500 includes all of the elements previously described in relation to the backup computing systems 100, 200, 300, and 400 and all of those elements need not be shown or described in relation to FIGS. 5A-5C.

FIG. 5A illustrates a backup operation. During the backup operation, the backup control system 140 copies a working frozen copy 520 of the large namespace 130 into a shared protection namespace 510 of the backup storage 120, which may correspond to the shared protection namespace 150. As illustrated, working frozen copy 520 includes six individual files: a file A, a file B, a file C, a file D, a file E, and a file F. It will be appreciated that only including six files in working frozen copy 520 is for ease of explanation only and that working frozen copy 520 may include any number of additional files, usually numbering in the millions of files.

The backup control system 140 then instructs the shared protection namespace 510 to take a snapshot 530 of the shared protection namespace 510 at the time the working frozen copy 520 is copied to the shared protection namespace 510. As with the embodiment of FIGS. 4A and 4B, once the snapshot 530 is generated, any changes made to the large namespace 130 are able to be written to the working frozen copy 520. Thus, the working frozen copy included in the snapshot 530 is labeled as working frozen copy 520A. This is to indicate that the working frozen copy 520 in the namespace 510 is now free to be changed as previously described and the working frozen copy 520A is the version of the working frozen copy 520 that existed at the time the snapshot 530 was generated In this embodiment, the snapshot 530 is designated as the "current" snapshot since it is the snapshot currently being used in the backup operation.

The backup control system 140 instructs the shared protection namespace 510 to make a PIT copy 540 of the working frozen copy 520A and, while generating the PIT copy 540, to stack each of the individual files in the working frozen copy 520A into at least one horizontal file having a flat structure. As shown in FIG. 5A the individual files A-F are brought forward from the working frozen copy 520A that is included in the snapshot 530. The individual files A-F are stacked into a horizontal file 542 that is generated in the manner previously described.

Once the horizontal file 542 has been generated, the retention lock engine 125 of the backup storage 120 is able to apply a retention lock to the horizontal file 542. As illustrated, the PIT copy 540 includes the horizontal file 542 which has been retention locked. Since the horizontal file 542 is a single file (or a small number of files as previously described), the amount of computing resources and time needed to apply the retention lock to the horizontal file 542 is greatly reduced when compared to applying the retention lock to each individual file. In this embodiment, the snapshot 530 is not released once the PIT copy 540 has been generated, but is designated as the "last" snapshot and will be used in a snapshot difference operation as will be explained in more detail to follow.

FIG. 5B illustrates a subsequent backup operation that is made after changes have been made to the large namespace 130 during subsequent operation of the application utilizing the primary storage 110. During the subsequent backup operation, the backup control system 140 copies a working frozen copy 550 of the large namespace 130 into the shared protection namespace 510. As illustrated, working frozen copy 550 includes seven individual files: the file A, a file B', the file C, the file D, the file E, the file F, and a file G. Thus, the changes made to the large namespace 130 during the subsequent operation include file B being updated to file B' and the addition of the file G, while no changes have been made to files A, C, D, E, and F.

The backup control system 140 then instructs the shared protection namespace 510 to take a snapshot 560 of the shared protection namespace 510 at the time the working frozen copy 550 is copied to the shared protection namespace 510. As previously described, once the snapshot 560 is generated, any changes made to the large namespace 130 are able to be written to the working frozen copy 550. Thus, the working frozen copy included in the snapshot 560 is labeled as working frozen copy 550A. This is to indicate that the working frozen copy 550 in the namespace 510 is now free to be changed as previously described and the working frozen copy 550A is the version of the working frozen copy 550 that existed at the time the snapshot 560 was generated. In this embodiment, the snapshot 560 is now designated as the "current" snapshot since it is the snapshot currently being used in the backup operation. As mentioned previously, the snapshot 530 is retained (i.e., not released when the PIT copy 540 has been generated) and the designation of the snapshot 530 is moved from "current" to "last".

The backup control system 140 instructs the shared protection namespace 510 to make a PIT copy 570 of the working frozen copy 550A and, while generating the PIT copy 570, to stack each of the individual files in the working frozen copy 550A into at least one horizontal file having a flat structure. In the embodiment of FIG. 5B, to generate the at least one horizontal file, the shared protection namespace 510 performs a snapshot difference operation (also referred to as a "Diff" operation) 580. It will be appreciated that a snapshot difference operation is different from the metadata difference operations previously described. The snapshot difference operation is a built in function of the backup storage 120. In the snapshot difference operation, since two snapshots are being compared, there is no need to do a metadata comparison as in the metadata difference operation. Rather, both snapshots are directly compared, and this is done in a very small amount of time, in some embodiments almost instantaneously. Thus, the embodiments of FIGS. 5A-5C do not use the metadata index file 126 for the snapshot difference operation, although the embodiments of FIGS. 5A-5C still may use the metadata index file for other purposes. Thus, although not illustrated, the embodiments of FIGS. 5A-5C include the metadata index file 126. The snapshot difference operation 580 will now be described.

During the snapshot difference operation 580, the shared protection namespace 510 walks through and compares the working frozen copy 550A that is included in the "current" snapshot 560 and the working frozen copy 520A that is included in the "last" snapshot 530 to determine the subset of files that are included in both the working frozen copy 550A that is included in the "current" snapshot 560 and the working frozen copy 520A that is included in the "last" snapshot 530 and to determine the subset of files that are only included in the working frozen copy 550A. As shown at 585, the files A, C, D, E, and F are included in both the working frozen copy 550A and the working frozen copy 520A, while the files B' and G are new and thus are only included in the working frozen copy 550A.

The shared protection namespace 510 then stacks the individual files A, B', C, D, E, F, and G into a horizontal file 572. As shown in FIG. 5B, the files A, C, D, E, and F that are included in both the working frozen copy 550A that is included in the "current" snapshot 560 and the working frozen copy 520A that is included in the "last" snapshot 530 are brought from the horizontal file 542 to the horizontal file 572. In some embodiments, the metadata index file 126 is used to determine the files of the horizontal file 542 that are to be brought forward to the horizontal file 572 in embodiments where backup system is not able to directly determine the contents of horizontal file 542. Only the files B' and G, which are only included in the working frozen copy 550A that is included in the "current" snapshot 560, are brought from the working frozen copy 550A to horizontal file 572. Since only files that have changed are brought forward from the working frozen copy 550 that is included in the "current" snapshot 560, the number of files that need to be brought forward from the working frozen copy 550A that is included in the "current" snapshot 560 is greatly reduced. In addition, the number of operations needed to bring the files A, C, D, E, and F that are included in both the PIT copy 540 and the working frozen copy 550A from the horizontal file 542 to the horizontal file 572 is reduced by the process previously explained in relation to embodiments 300 and 400.

It is noted that FIG. 5B shows that the files A, C, D, E, and F are brought from the horizontal file 542 of the PIT copy 540 included in the shared protection namespace 510. However, this need not be the case. Although not illustrated, as described previously in relation to 490 of the embodiment of FIG. 4B, the files A, C, D, E, and F may alternatively be brought from the horizontal file 542 in the "current" snapshot 560 to the horizontal file 572.

Once the horizontal file 572 has been generated, the retention lock engine 125 of the backup storage 120 is able to apply a retention lock to the horizontal file 572. As illustrated, the PIT copy 570 includes the horizontal file 572 which has been retention locked. Since the horizontal file 572 is a single file (or a small number of files as previously described), the amount of computing resources and time needed to apply the retention lock to the horizontal file 572 is greatly reduced when compared to applying the retention lock to each individual file. In this embodiment, the snapshot 560 is not released once the PIT copy 570 has been generated, but has its designation changed from "current" snapshot to "last" snapshot. The snapshot 530 is released at this time. The "last" snapshot 560 will then be used in a subsequent snapshot difference operation with a new "current" snapshot.

FIG. 5C illustrates a further subsequent backup operation that is made after changes have been made to the large namespace 130 during subsequent operation of the application utilizing the primary storage 110. During the further subsequent backup operation, the backup control system 140 copies a working frozen copy 591 of the large namespace 130 into the shared protection namespace 510. As illustrated, working frozen copy 591 includes seven individual files: the file A, the file B', the file C, the file D, the file E, the file F, and a file G'. Thus, the changes made to the large namespace 130 during the further subsequent operation include file G being updated to file G', while no changes have been made to files A, B', C, D, E, and F.

The backup control system 140 then instructs the shared protection namespace 510 to take a snapshot 592 of the shared protection namespace 510 at the time the working frozen copy 591 is copied to the shared protection namespace 510. As previously described, once the snapshot 591 is generated, any changes made to the large namespace 130 are able to be written to the working frozen copy 591. Thus, the working frozen copy included in the snapshot 592 is labeled as working frozen copy 591A. This is to indicate that the working frozen copy 591 in the namespace 510 is now free to be changed as previously described and the working frozen copy 591A is the version of the working frozen copy 591 that existed at the time the snapshot 592 was generated. In this embodiment, the snapshot 592 is now designated as the "current" snapshot since it is the snapshot currently being used in the backup operation. As mentioned previously, the snapshot 560 is retained (i.e., not released when the PIT copy 570 has been generated) and the designation of the snapshot 560 is moved from "current" to "last". This shows that in the embodiment 500, a snapshot is always retained whenever a backup operation is performed as the formerly "current" snapshot will then be retained as the "last" snapshot.

The backup control system 140 instructs the shared protection namespace 510 to make a PIT copy 594 of the working frozen copy 591A and, while generating the PIT copy 594, to stack each of the individual files in the working frozen copy 591A into at least one horizontal file having a flat structure. In the embodiment of FIG. 5C, to generate the at least one horizontal file, the shared protection namespace 510 performs the snapshot difference operation 580.

During the snapshot difference operation 580, the shared protection namespace 510 walks through and compares the working frozen copy 591A that is included in the "current" snapshot 592 and the working frozen copy 550A that is included in the "last" snapshot 560 to determine the subset of files that are included in both the working frozen copy 591A that is included in the "current" snapshot 592 and the working frozen copy 550A that is included in the "last" snapshot 560 and to determine the subset of files that are only included in the working frozen copy 591A. As shown at 590, the files A, B', C, D, E, and F are included in both the working frozen copy 591A and the working frozen copy 550A, while the file G' is new and thus is only included in the working frozen copy 591A.

The shared protection namespace 510 then stacks the individual files A, B', C, D, E, F, and G' into a horizontal file 593. As shown in FIG. 6C, the files A, B', C, D, E, and F are included in both the working frozen copy 591A and the working frozen copy 550A are brought from the horizontal file 572 to the horizontal file 593. In some embodiments, the metadata index file 126 is used to determine the files of the horizontal file 572 that are to be brought forward to the horizontal file 593 in embodiments where backup system is not able to directly determine the contents of horizontal file 572. Only the file G', which is only included in the working frozen copy 591A that is included in the "current" snapshot 591, is brought from the working frozen copy 591A to horizontal file 593. Since only files that have changed are brought forward from the working frozen copy 591A, the number of files that need to be brought forward from the working frozen copy 591A is greatly reduced. In addition, the number of operations needed to bring the files A, B', C, D, E, and F that are included in both the PIT copy 570 and the working frozen copy 591A from the horizontal file 572 to the horizontal file 593 is reduced by the process previously explained in relation to embodiments 300 and 400.

It is noted that FIG. 5C shows that the files A, B', C, D, E, and F are brought from the horizontal file 572 of the PIT copy 570 included in the shared protection namespace 510. However, this need not be the case. Although not illustrated, as described previously in relation to 490 of the embodiment of FIG. 4B, the files A, B', C, D, E, and F may alternatively be brought from the horizontal file 572 in the "current" snapshot 592 to the horizontal file 593.

Once the horizontal file 593 has been generated, the retention lock engine 125 of the backup storage 120 is able to apply a retention lock to the horizontal file 593. As illustrated, the PIT copy 594 includes the horizontal file 593 which has been retention locked. Since the horizontal file 593 is a single file (or a small number of files as previously described), the amount of computing resources and time needed to apply the retention lock to the horizontal file 594 is greatly reduced when compared to applying the retention lock to each individual file. In this embodiment, the snapshot 592 is released once the PIT copy 594 has been generated, but will have its designation changed from "current" snapshot to "last" snapshot. The "last" snapshot 592 will then be used in a subsequent snapshot difference operation with a new "current" snapshot.

For all backup operations following the backup operation described in FIG. 5C, the process will be repeated. That is, a working frozen copy will be copied to the shared protection namespace 510 and a snapshot will be taken of the working frozen copy. At least one horizontal file will then be generated for the individual files of the working frozen copy included in the snapshot where the files that are included in the working frozen copy included in the "current" snapshot and that are included in the working frozen copy included in the "last" snapshot are brought forward from the horizontal file of the most recent PIT copy and the files only included in the working frozen copy included in the "current" snapshot are brought forward from the working frozen copy included in the "current" snapshot. A retention lock will be applied to the at least one horizontal file. It will be appreciated that the embodiment of FIGS. 5A-5C combines the non-limiting advantages of the embodiments discussed previously.

It is noted with respect to the disclosed methods, including the example method of FIG. 6, that any operations of any of these methods, may be performed in response to, as a result of, and/or, based upon, the performance of any preceding operations. Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Figure 6A:
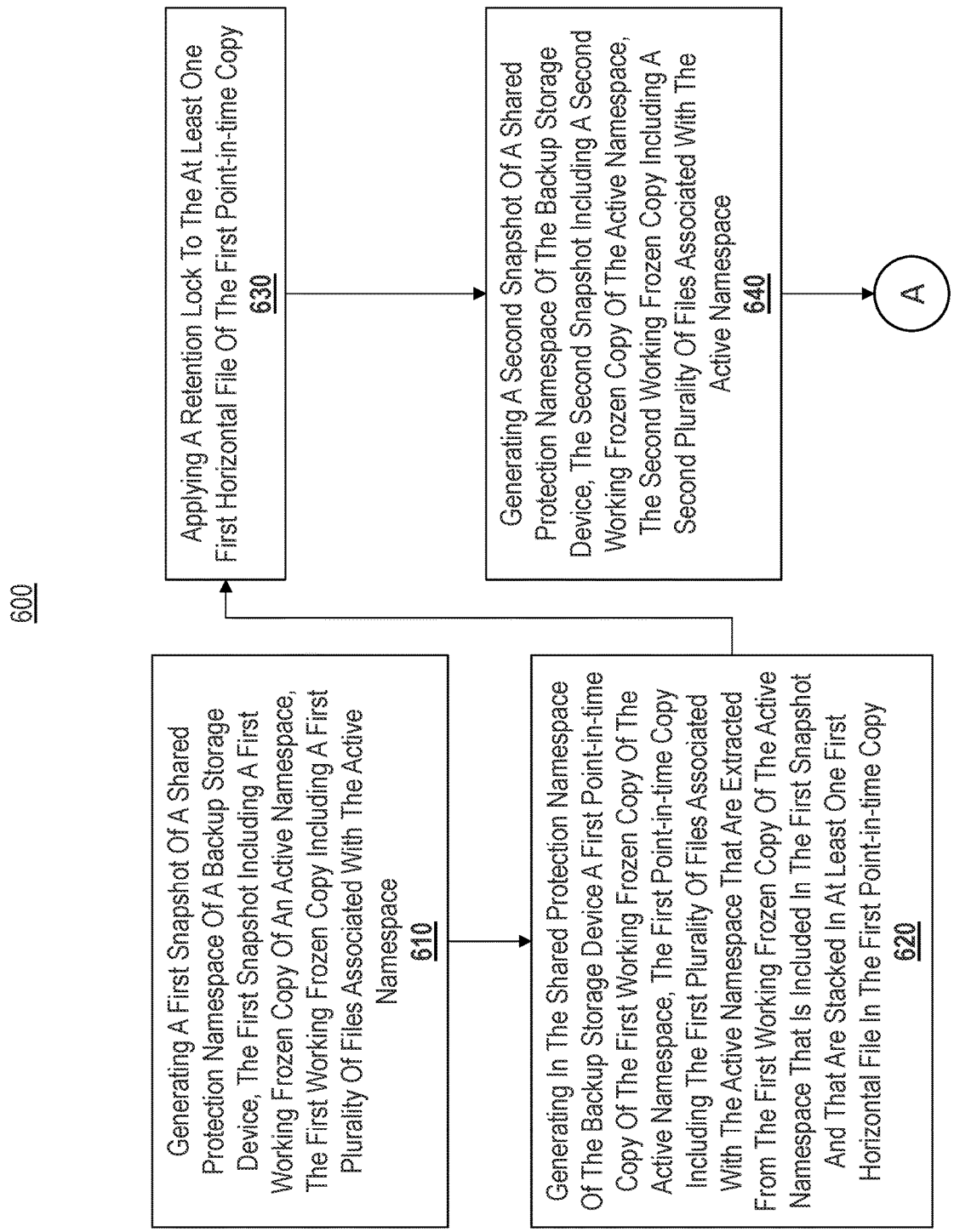
FIGS. 6A and 6B disclose aspects of a method according to the embodiments disclosed herein.
Figure 6B:
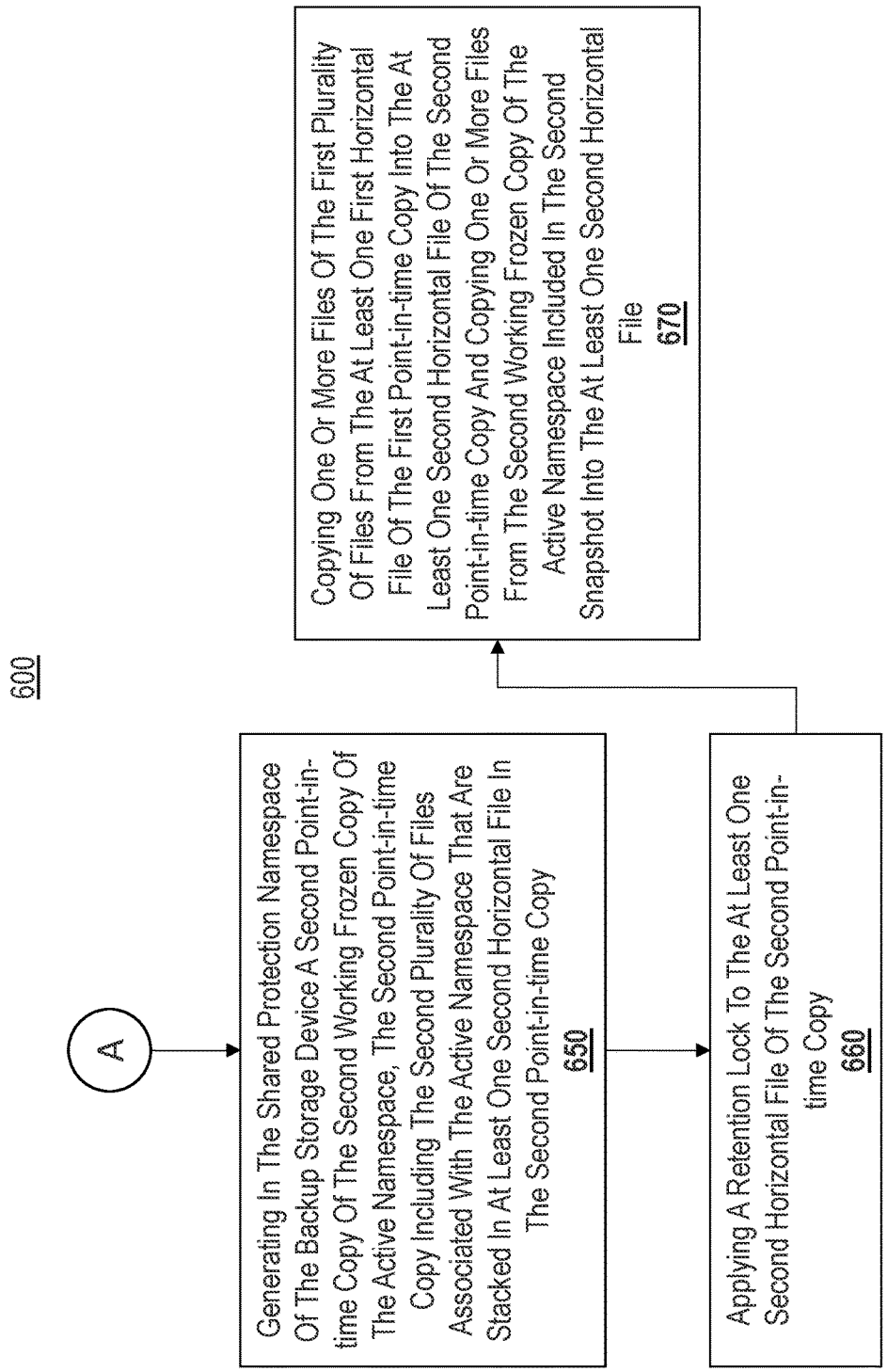

Directing attention now to FIGS. 6A and 6B, an example method 600 is disclosed. The method 600 will be described in relation to one or more of the figures previously described, although the method 600 is not limited to any particular embodiment.

The method 600 includes generating a first snapshot of a shared protection namespace of a backup storage device, the first snapshot including a first working frozen copy of an active namespace, the first working frozen copy including a first plurality of files associated with the active namespace (610). For example, as previously described the snapshot 430 or 530 is generated. These snapshots include the working frozen copy 420A or working frozen copy 520A. The working frozen copies 420A and 520A include the files A-F.

The method 600 includes generating in the shared protection namespace of the backup storage device a first point-in-time copy of the first working frozen copy of the active namespace, the first point-in-time copy including the first plurality of files associated with the active namespace that are extracted from the first working frozen copy of the active namespace that is included in the first snapshot and that are stacked in at least one first horizontal file in the first point-in-time copy (620). For example, as previously described the PIT copy 440 of the working frozen copy 420A or the PIT copy 540 of the working frozen copy 520A are generated. The PIT copy 440 includes the horizontal file 442 and the PIT copy 540 includes the horizontal file 542.

The method 600 includes applying a retention lock to the at least one first horizontal file of the first point-in-time copy (630). For example, as previously described the retention lock engine 125 of the backup storage 120 applies a retention lock to each horizontal file 442 or 542.

The method 600 includes generating a second snapshot of the shared protection namespace of a backup storage device, the second snapshot including a second working frozen copy of the active namespace, the second working frozen copy including a second plurality of files associated with the active namespace (640). For example, as previously described the snapshot 460 or 560 is generated. These snapshots include the working frozen copy 450A or working frozen copy 550A. The working frozen copies 450A and 550A include the files A, B' and C-G.

The method 600 includes generating in the shared protection namespace of the backup storage device a second point-in-time copy of the second working frozen copy of the active namespace, the second point-in-time copy including the second plurality of files associated with the active namespace that are stacked in at least one second horizontal file in the second point-in-time copy (650). For example, as previously described the PIT copy 470 or the PIT copy 570 are generated. The PIT copy 470 includes the horizontal file 472 and the PIT copy 570 includes the horizontal file 572.

The method 600 includes applying a retention lock to the at least one second horizontal file of the second point-in-time copy (660). For example, as previously described the retention lock engine 125 of the backup storage 120 applies a retention lock to each horizontal file 472 or 572.

The method 600 includes wherein generating the second point-in-time copy comprises copying one or more files of the first plurality of files from the at least one first horizontal file of the first point-in-time copy into the at least one second horizontal file of the second point-in-time copy and copying one or more files from the second working frozen copy of the active namespace included in the second snapshot into the at least one second horizontal file (670). For example, as previously described when generating the PIT copy 470 or 570, some files are copied from the horizontal file 440 or 540 and some files are copied from the second working frozen copies 450A or 550A.

Following are some further example embodiments of the invention. These are presented only by way of example and are not intended to limit the scope of the invention in any way.

Embodiment 1. A method, comprising: generating a first snapshot of a shared protection namespace of a backup storage device, the first snapshot including a first working frozen copy of an active namespace, the first working frozen copy including a first plurality of files associated with the active namespace; generating in the shared protection namespace of the backup storage device a first point-in-time copy of the first working frozen copy of the active namespace, the first point-in-time copy including the first plurality of files associated with the active namespace that are extracted from the first working frozen copy of the active namespace that is included in the first snapshot and that are stacked in at least one first horizontal file in the first point-in-time copy; applying a retention lock to the at least one first horizontal file of the first point-in-time copy; generating a second snapshot of the shared protection namespace of the backup storage device, the second snapshot including a second working frozen copy of the active namespace, the second working frozen copy of the active namespace including a second plurality of files associated with the active namespace; generating in the shared protection namespace of the backup storage device a second point-in-time copy of the second working frozen copy of the active namespace, the second point-in-time copy including the second plurality of files associated with the active namespace that are stacked in at least one second horizontal file in the second point-in-time copy; applying a retention lock to the at least one second horizontal file of the second point-in-time copy; and wherein generating the second point-in-time copy comprises copying one or more files of the first plurality of files from the at least one first horizontal file of the first point-in-time copy into the at least one second horizontal file of the second point-in-time copy and copying one or more files from the second working frozen copy of the active namespace included in the second snapshot into the at least one second horizontal file.

Embodiment 2. The method of embodiment 1, further comprising performing a snapshot difference operation comprising: comparing the first plurality of files included in the first working frozen copy included in the first snapshot with the second plurality of files included in the second working frozen copy included in the second snapshot; and based on the comparison, determining a first subset of files that are only included in both the first and second working frozen copies and a second subset of files only included in the second working frozen copy.

Embodiment 3. The method of embodiments 1-2, further comprising: copying the first subset of files from the at least one first horizontal file of the first point-in-time copy into the at least one second horizontal file of the second point-in-time copy; and copying the second subset of files from the second working frozen copy of the active namespace into the at least one second horizontal file of the second point-in-time copy.

Embodiment 4. The method of embodiments 1-3, wherein the first subset of files copied from the at least one first horizontal file of the first point-in-time copy into the at least one second horizontal file of the second point-in-time copy are copied from the at least one horizontal file of the first point-in-time copy of the first working frozen copy of the active namespace included in the first snapshot.

Embodiment 5. The method of embodiments 1-4, further comprising: labeling the first snapshot as a current snapshot at a time the first snapshot is generated; and at the time the second snapshot is generated, labeling the first snapshot as a last snapshot and labeling the second snapshot as the current snapshot.

Embodiment 6. The method of embodiments 1-5, wherein the first snapshot is not released after the second subset of files are copied into the at least one second horizontal file of the second point-in-time copy.

Embodiment 7. The method of embodiments 1-6, wherein the first point-in-time copy of the first working frozen copy of the active namespace is generated from the first working frozen copy of the active namespace included in the first snapshot.

Embodiment 8. The method of embodiments 1-7, wherein a number of operations needed to copy the one or more files of the first plurality of files from the at least one first horizontal file of the first point-in-time copy into the at least one second horizontal file of the second point-in-time copy and to copy the one or more files from the second working frozen copy of the active namespace included in the second snapshot into the at least one second horizontal file is at most two times a number of files that have changed between the first working frozen copy and the second working frozen copy The method of embodiments 1-8, wherein the first plurality of files associated with the active namespace are stacked in the at least one first horizontal file in the first point-in-time copy by alternating metadata and file data in the at least one first horizontal file.

Embodiment 10. The method of embodiments 1-9, further comprising: generating a third snapshot of the shared protection namespace of the backup storage device, the third snapshot including a third working frozen copy of the active namespace, the third working frozen copy of the active namespace including a third plurality of files associated with the active namespace; performing a snapshot difference operation between the second snapshot and the third snapshot to thereby generate in the shared protection namespace of the backup storage device a third point-in-time copy of the third working frozen copy of the active namespace, the third point-in-time copy including the third plurality of files associated with the third active namespace that are stacked in at least one third horizontal file in the third point-in-time copy; and applying a retention lock to the at least one third horizontal file of the second point-in-time copy; wherein generating the third point-in-time copy comprises copying one or more files of the second plurality of files from the at least one second horizontal file of the second point-in-time copy into the at least one third horizontal file of the third point-in-time copy and copying one or more files from the third working frozen copy of the active namespace included in the third snapshot into the at least one third horizontal file.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that are executed on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
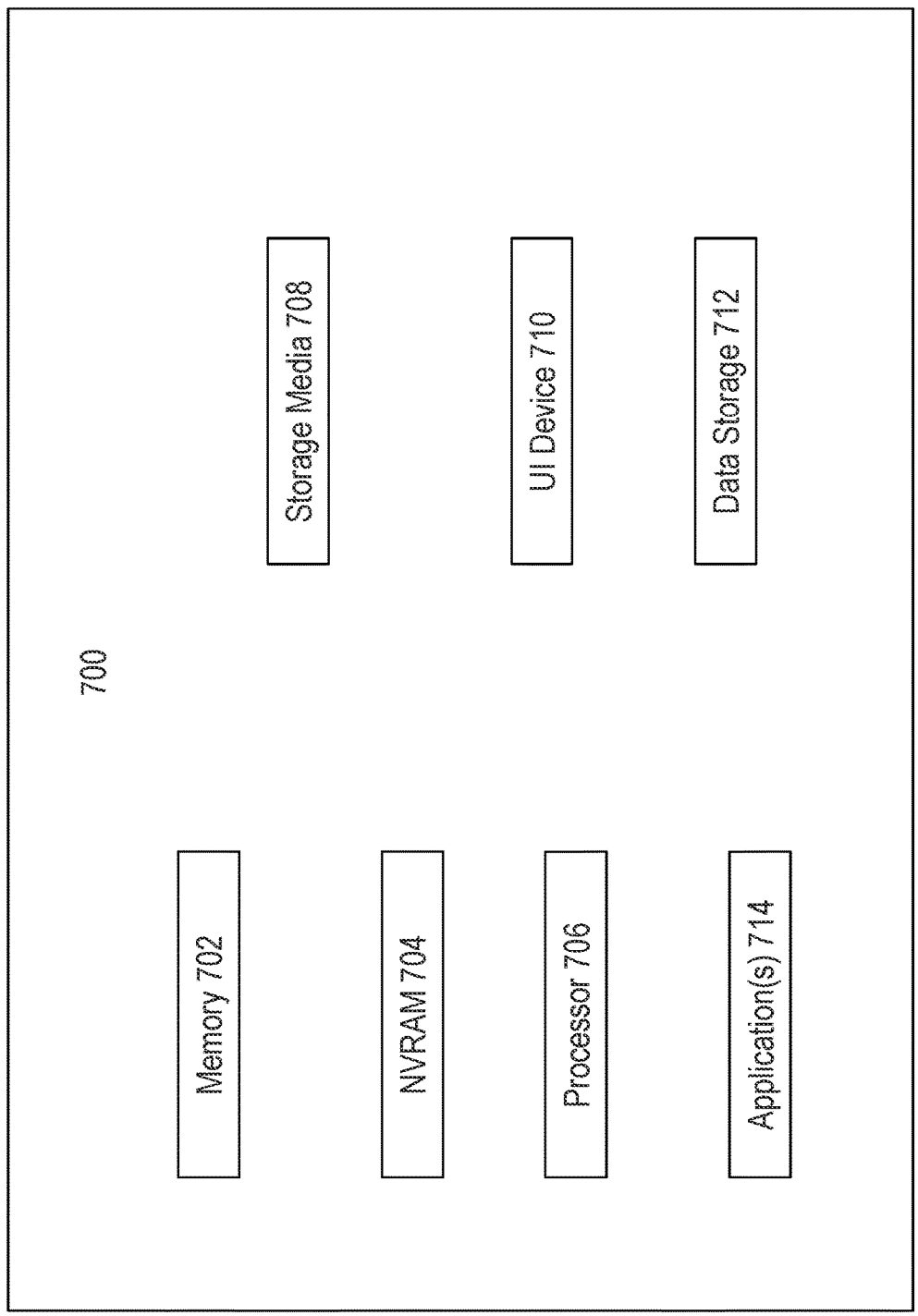
FIG. 7 discloses aspects of a computing device, system, or entity according to the embodiments disclosed herein.

With reference briefly now to FIG. 7, any one or more of the entities disclosed, or implied, by the previously described figures, and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes memory components 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
generating a first snapshot of a shared protection namespace of a backup storage device, the first snapshot including a first working frozen copy of an active namespace, the first working frozen copy including a first plurality of files associated with the active namespace;
generating in the shared protection namespace of the backup storage device a first point-in-time copy of the first working frozen copy of the active namespace, the first point-in-time copy including the first plurality of files associated with the active namespace that are extracted from the first working frozen copy of the active namespace that is included in the first snapshot and that are stacked in at least one first horizontal file in the first point-in-time copy;
applying a retention lock to the at least one first horizontal file of the first point-in-time copy;
generating a second snapshot of the shared protection namespace of the backup storage device, the second snapshot including a second working frozen copy of the active namespace, the second working frozen copy of the active namespace including a second plurality of files associated with the active namespace;
generating in the shared protection namespace of the backup storage device a second point-in-time copy of the second working frozen copy of the active namespace, the second point-in-time copy including the second plurality of files associated with the second active namespace that are stacked in at least one second horizontal file in the second point-in-time copy; and
applying a retention lock to the at least one second horizontal file of the second point-in-time copy;
wherein generating the second point-in-time copy comprises copying one or more files of the first plurality of files from the at least one first horizontal file of the first point-in-time copy into the at least one second horizontal file of the second point-in-time copy and copying one or more files from the second working frozen copy of the active namespace included in the second snapshot into the at least one second horizontal file.

2. The method of claim 1, further comprising performing a snapshot difference operation comprising:
comparing the first plurality of files included in the first working frozen copy included in the first snapshot with the second plurality of files included in the second working frozen copy included in the second snapshot; and
based on the comparison, determining a first subset of files that are only included in both the first and second working frozen copies and a second subset of files only included in the second working frozen copy.

3. The method of claim 2, further comprising:
copying the first subset of files from the at least one first horizontal file of the first point-in-time copy into the at least one second horizontal file of the second point-in-time copy; and
copying the second subset of files from the second working frozen copy of the active namespace into the at least one second horizontal file of the second point-in-time copy.

4. The method of claim 3, wherein the first subset of files copied from the at least one first horizontal file of the first point-in-time copy into the at least one second horizontal file of the second point-in-time copy are copied from the at least one horizontal file of the first point-in-time copy of the first working frozen copy of the active namespace included in the first snapshot.

5. The method of claim 1, further comprising:
labeling the first snapshot as a current snapshot at a time the first snapshot is generated; and
at the time the second snapshot is generated, labeling the first snapshot as a last snapshot and labeling the second snapshot as the current snapshot.

6. The method of claim 1, wherein the first snapshot is not released after the second subset of files are copied into the at least one second horizontal file of the second point-in-time copy.

7. The method of claim 1, wherein a number of operations needed to copy the one or more files of the first plurality of files from the at least one first horizontal file of the first point-in-time copy into the at least one second horizontal file of the second point-in-time copy and to copy the one or more files from the second working frozen copy of the active namespace included in the second snapshot into the at least one second horizontal file is at most two times a number of files that have changed between the first working frozen copy and the second working frozen copy.

8. The method of claim 7, wherein files that are contiguous in the at least one first horizontal file of the first point-in-time copy are copied to the at least one second horizontal file of the second point-in-time copy in a same operation.

9. The method of claim 1, wherein the first plurality of files associated with the active namespace are stacked in the at least one first horizontal file in the first point-in-time copy by alternating metadata and file data in the at least one first horizontal file.

10. The method of claim 1, further comprising:
generating a third snapshot of the shared protection namespace of the backup storage device, the third snapshot including a third working frozen copy of the active namespace, the third working frozen copy of the active namespace including a third plurality of files associated with the active namespace;
performing a snapshot difference operation between the second snapshot and the third snapshot to thereby generate in the shared protection namespace of the backup storage device a third point-in-time copy of the third working frozen copy of the active namespace, the third point-in-time copy including the third plurality of files associated with the third active namespace that are stacked in at least one third horizontal file in the third point-in-time copy; and
applying a retention lock to the at least one third horizontal file of the second point-in-time copy;
wherein generating the third point-in-time copy comprises copying one or more files of the second plurality of files from the at least one second horizontal file of the second point-in-time copy into the at least one third horizontal file of the third point-in-time copy and copying one or more files from the third working frozen copy of the active namespace included in the third snapshot into the at least one third horizontal file.

11. A non-transitory storage medium having stored therein instructions that are executable by one or more hardware processors to perform operations comprising:
generating a first snapshot of a shared protection namespace of a backup storage device, the first snapshot including a first working frozen copy of an active namespace, the first working frozen copy including a first plurality of files associated with the active namespace;

generating in the shared protection namespace of the backup storage device a first point-in-time copy of the first working frozen copy of the active namespace, the first point-in-time copy including the first plurality of files associated with the active namespace that are extracted from the first working frozen copy of the active namespace that is included in the first snapshot and that are stacked in at least one first horizontal file in the first point-in-time copy;

applying a retention lock to the at least one first horizontal file of the first point-in-time copy;

generating a second snapshot of the shared protection namespace of the backup storage device, the second snapshot including a second working frozen copy of the active namespace, the second working frozen copy of the active namespace including a second plurality of files associated with the active namespace;

generating in the shared protection namespace of the backup storage device a second point-in-time copy of the second working frozen copy of the active namespace, the second point-in-time copy including the second plurality of files associated with the second active namespace that are stacked in at least one second horizontal file in the second point-in-time copy; and applying a retention lock to the at least one second horizontal file of the second point-in-time copy;

wherein generating the second point-in-time copy comprises copying one or more files of the first plurality of files from the at least one first horizontal file of the first point-in-time copy into the at least one second horizontal file of the second point-in-time copy and copying one or more files from the second working frozen copy of the active namespace included in the second snapshot into the at least one second horizontal file.

12. The non-transitory storage medium of claim 11, further comprising performing a snapshot difference operation comprising:
comparing the first plurality of files included in the first working frozen copy included in the first snapshot with the second plurality of files included in the second working frozen copy included in the second snapshot; and
based on the comparison, determining a first subset of files that are only included in both the first and second working frozen copies and a second subset of files only included in the second working frozen copy.

13. The non-transitory storage medium of claim 12, further comprising:
copying the first subset of files from the at least one first horizontal file of the first point-in-time copy into the at least one second horizontal file of the second point-in-time copy; and
copying the second subset of files from the second working frozen copy of the active namespace into the at least one second horizontal file of the second point-in-time copy.

14. The non-transitory storage medium of claim 13, wherein the first subset of files copied from the at least one first horizontal file of the first point-in-time copy into the at least one second horizontal file of the second point-in-time copy are copied from the at least one horizontal file of the first point-in-time copy of the first working frozen copy of the active namespace included in the first snapshot.

15. The non-transitory storage medium of claim 11, further comprising:
labeling the first snapshot as a current snapshot at a time the first snapshot is generated; and
at the time the second snapshot is generated, labeling the first snapshot as a last snapshot and labeling the second snapshot as the current snapshot.

16. The non-transitory storage medium of claim 11, wherein the first snapshot is not released after the second subset of files are copied into the at least one second horizontal file of the second point-in-time copy.

17. The non-transitory storage medium of claim 11, wherein the first point-in-time copy of the first working frozen copy of the active namespace is generated from the first working frozen copy of the active namespace included in the first snapshot.

18. The non-transitory storage medium of claim 11, wherein a number of operations needed to copy the one or more files of the first plurality of files from the at least one first horizontal file of the first point-in-time copy into the at least one second horizontal file of the second point-in-time copy and to copy the one or more files from the second working frozen copy of the active namespace included in the second snapshot into the at least one second horizontal file is at most two times a number of files that have changed between the first working frozen copy and the second working frozen copy.

19. The non-transitory storage medium of claim 11, wherein the first plurality of files associated with the active namespace are stacked in the at least one first horizontal file in the first point-in-time copy by alternating metadata and file data in the at least one first horizontal file.

20. The non-transitory storage medium of claim 11, further comprising:
generating a third snapshot of the shared protection namespace of the backup storage device, the third snapshot including a third working frozen copy of the active namespace, the third working frozen copy of the active namespace including a third plurality of files associated with the active namespace;
performing a snapshot difference operation between the second snapshot and the third snapshot to thereby generate in the shared protection namespace of the backup storage device a third point-in-time copy of the third working frozen copy of the active namespace, the third point-in-time copy including the third plurality of files associated with the third active namespace that are stacked in at least one third horizontal file in the third point-in-time copy; and
applying a retention lock to the at least one third horizontal file of the second point-in-time copy;
wherein generating the third point-in-time copy comprises copying one or more files of the second plurality of files from the at least one second horizontal file of the second point-in-time copy into the at least one third horizontal file of the third point-in-time copy and copying one or more files from the third working frozen copy of the active namespace included in the third snapshot into the at least one third horizontal file.

* * * * *